United States Patent [19]
Kanbara et al.

[11] Patent Number: 5,538,811
[45] Date of Patent: Jul. 23, 1996

[54] IONIC CONDUCTIVE POLYMER ELECTROLYTE

[75] Inventors: Teruhisa Kanbara, Ikeda; Kenichi Takeyama, Osaka; Yuichiro Tsubaki, Kyoto, all of Japan

[73] Assignee: Matsushita Electric Industrial Co., Ltd., Osaka, Japan

[21] Appl. No.: 62,782

[22] Filed: May 14, 1993

[30] Foreign Application Priority Data

Jul. 23, 1992 [JP] Japan ................................ 4-196754
Dec. 28, 1992 [JP] Japan ................................ 4-348114

[51] Int. Cl.⁶ .................................................. H01M 6/16
[52] U.S. Cl. ........................... 429/192; 429/194; 429/218; 252/622
[58] Field of Search ............................. 429/192, 194, 429/218; 252/62.2; 524/157

[56] References Cited

U.S. PATENT DOCUMENTS

| | | | |
|---|---|---|---|
| 4,098,589 | 3/1992 | Motogami | 429/192 X |
| 4,792,504 | 12/1988 | Schwab et al. | 429/192 |
| 4,822,701 | 4/1989 | Ballard et al. | 429/192 |
| 4,908,283 | 3/1990 | Takahashi et al. | 429/192 |
| 4,970,012 | 11/1990 | Kuroda et al. | 252/62.2 |
| 4,990,413 | 2/1991 | Lee et al. | 429/191 |
| 5,016,991 | 5/1991 | Mason | 350/357 |
| 5,159,001 | 10/1992 | Motogami et al. | 524/157 |
| 5,219,679 | 6/1993 | Abraham et al. | 429/192 |
| 5,252,413 | 10/1993 | Alamgir | 429/192 |
| 5,268,243 | 12/1993 | Noda et al. | 429/192 |

FOREIGN PATENT DOCUMENTS

| | | |
|---|---|---|
| 0359524 | 3/1990 | European Pat. Off. . |
| 0411693 | 2/1991 | European Pat. Off. . |
| 0421546 | 4/1991 | European Pat. Off. . |
| 2640801 | 12/1989 | France . |
| 239514 | 2/1990 | Japan . |
| 239513 | 2/1990 | Japan . |
| 2186561 | 7/1990 | Japan . |
| 3205416 | 9/1991 | Japan . |
| 468064 | 3/1992 | Japan . |
| 8900771 | 1/1989 | WIPO . |

OTHER PUBLICATIONS

Kanbara et al, *Journal of Power Sources*, 36(1991), pp. 87–93 "New Solid–State Electric Double Layer Capacitor using Poly(Vinylalchol)–Based Polymer Solid Electrolyte".
Chandra et al, *Solid State Sonics*, 40/41(1990) pp. 651–654. "Studies on Ammonium Perchlorate Doped Polyethylene Oxide Polymer Electrolyte".

*Primary Examiner*—M. Nuzzolillo
*Attorney, Agent, or Firm*—Renner, Otto, Boisselle & Sklar

[57] ABSTRACT

An ionic conductive polymer electrolyte including a polymer having ether type oxygen in the structure and a plasticizer is provided. The plasticizer is at least one selected from the group consisting of compounds represented by the following general Formulas IV and V:

Formula IV:

$$R_1O-(C_2H_4O)_n-(C_3H_6O)_m-H$$

wherein n+m is 2, 3, 4 or 5, and $R_1=CH_3$, $C_2H_5$, $C_3H_7$ or $C_4H_9$; and Formula V:

$$R_1O-(C_2H_4O)_n-(C_3H_6O)_m-R_2$$

wherein n+m is 2, 3, 4, or 5 and $R_1=R_2=CH_3$.

62 Claims, 5 Drawing Sheets a: EXAMPLE 1.1
b: EXAMPLE 1.2
c: EXAMPLE 1.3
d: EXAMPLE 1.4
e: EXAMPLE 1.5
f: EXAMPLE 1.6
g: EXAMPLE 1.7
h: EXAMPLE 1.8
i: EXAMPLE 1.9
j: EXAMPLE 1.10
k: COMPARATIVE EXAMPLE 1.1
l: COMPARATIVE EXAMPLE 1.2
m: COMPARATIVE EXAMPLE 1.3

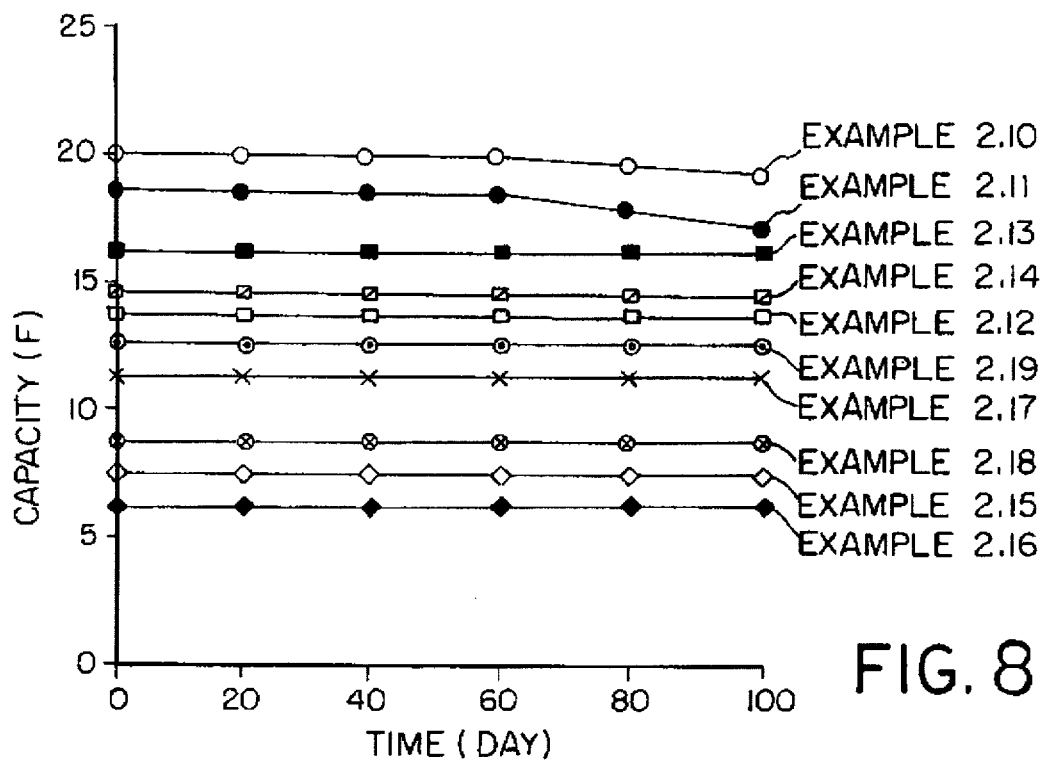
FIG. 8
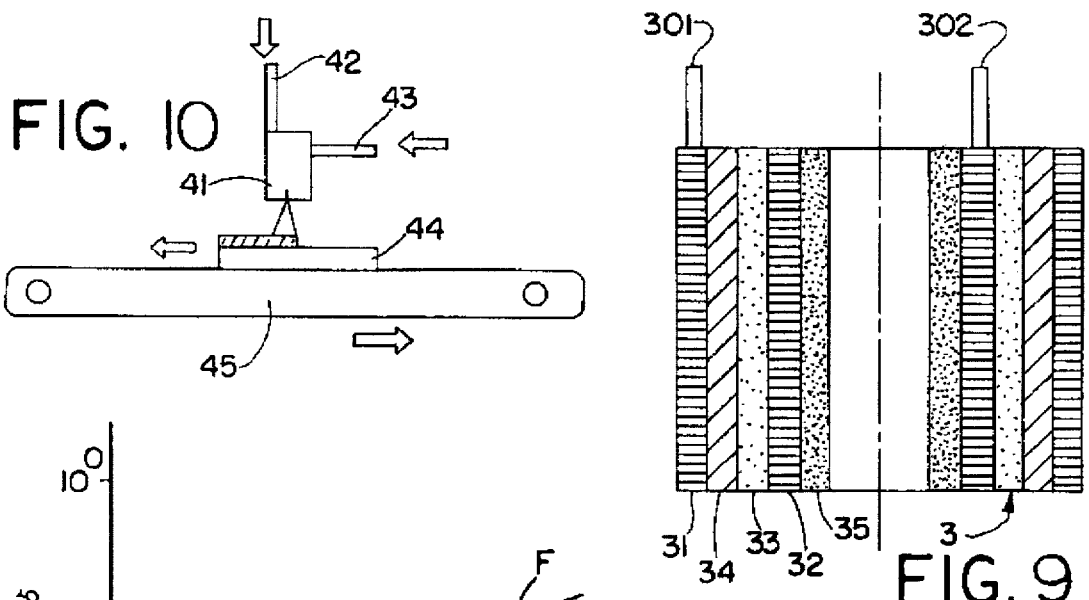
FIG. 10
FIG. 9
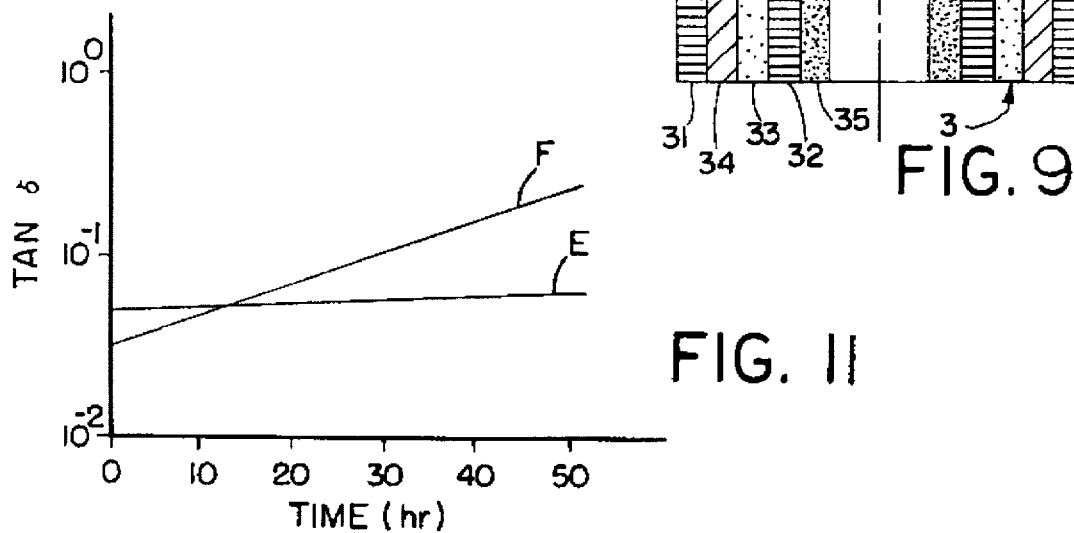
FIG. 11

IONIC CONDUCTIVE POLYMER ELECTROLYTE

BACKGROUND OF THE INVENTION

1. Field of the Invention

The present invention relates to an ionic conductive polymer electrolyte and an electrochemical device such as an electric double layer capacitor, an electrolytic capacitor and a lithium secondary battery produced by using the ionic conductive polymer electrolyte.

2. Description of the Related Art

Various kinds of electrolytes are used for driving an electrochemical device such as an electric double layer capacitor, an electrolytic capacitor and a lithium secondary battery. Each of these electrolytes is, for example, a combination of a medium with a high dielectric constant and a salt which can produce ions. Such electrolytes are required a high voltage to be decomposed, and are required to have a high electric conductivity, a high boiling point, a low freezing point and a low vapor pressure. Although a number of liquid electrolytes are used at present, most of those having a high boiling point generally have a high viscosity, and therefore, the electric conductivity thereof is low. When a liquid electrolyte with a low boiling point is used so as to attain a high electric conductivity, such an electrolyte is likely to evaporate while used for a long period of time.

An electrolyte conventionally used for driving an electrolytic capacitor is obtained, for example, by dissolving an organic ammonium salt in an organic solvent such as ethylene glycol and γ-butyrolactone. Electrolytes for driving a lithium secondary battery and an electric double layer capacitor are obtained, for example, by respectively dissolving an inorganic lithium salt and an organic ammonium salt in solvents with a high dielectric constant such as propylene carbonate and the like. These conventionally used electrolytes have a high electric conductivity.

However, electrochemical devices using the electrolyte made of an organic solvent have a difficulty in maintaining their reliability for a long period of time due to the evaporation of the organic solvent because an organic solvent with a low viscosity such as ethylene glycol has a low boiling point as mentioned above. Further disadvantageously, the electric conductivity of such an electrolyte is largely decreased as the temperature is lowered. Electrolytes using a solvent with a high dielectric constant such as γ-butyrolactone and propylene carbonate can exhibit a sufficiently high electric conductivity at room temperature. But these electrolytes inherently have a high viscosity, and thus, especially at a temperature below 0° C., the electric conductivity thereof is largely degraded. Therefore, in an electric double layer capacitor, which uses an electrode formed of a mixture of such an electrolyte and activated carbon, an impedance is largely increased especially at a temperature below −10° C.

An electrolyte is obtained by dissolving a lithium salt such as $LiClO_4$, $LiBF_4$ and $LiPF_6$ in solvent with a high dielectric constant, and is used for driving a lithium secondary battery using $CoO_2$ as a positive electrode active material and having a voltage of 4 V or more. In such a case, especially when such a lithium secondary battery is charged and stored at a temperature of about 70° C., the electrolyte is decomposed with time to generate a gas, resulting in deteriorating the characteristics of the lithium secondary battery.

Various solid electrolytes have recently been developed in order to solve the above described problems. A solid electrolyte used to be regarded unsuitable for practical use because ions are difficult to move in a solid as compared with in a liquid, and thus, the ionic conductivity of a solid electrolyte is markedly lower than that of a liquid electrolyte. However, a number of solids have recently been discovered which can selectively transmit only specific kinds of ions and have a high electric conductivity. When such a solid electrolyte is used in an electrochemical device, there is no possibility of leakage of the electrolyte can be minimized. As a result, the structure of the electrochemical device can be simplified, resulting in a compact device with a long life. Moreover, such a device can be used at a higher temperature, resulting in an electrochemical device with a higher quality. As such a solid electrolyte, combinations of various organic or inorganic solids-and various salts are now proposed. Especially, a solid electrolyte using an organic polymer, and an electrochemical device using the solid electrolyte are proposed.

An electric double layer capacitor is a rechargeable power supply to be used similarly to a secondary battery. The electric double layer capacitor generally has a laminate structure having a current collector, an electrode, an electrolytic layer, another electrode and another current collector. The current collector herein is a electrically conductive plate made of an electrically conductive material such as aluminum. In a conventional electric double layer capacitor using a liquid electrolyte, an electrode is produced by applying a paste including activated carbon, a binder resin such as fluororesin and an electrically conductive material such as acetylene black onto the current collector and heat-treating the resultant current collector with the paste. The electrolytic layer is produced by soaking a separator made of a cloth or the like with a liquid electrolyte.

The liquid electrolyte to be used in the electric double layer capacitor generally contains, for example, sulfuric acid or an organic solvent. The liquid electrolyte which contains sulfuric acid has a withstand voltage as low as approximately 1.2 V, which is lower than the voltage required for electrolysis of water. However, this liquid electrolyte has an extremely high electric conductivity of approximately 0.7 S/cm. Due to these characteristics, such a liquid electrolyte containing sulfuric acid is used for a power supply where a comparatively large output current is required, for example, for a backup power supply for driving an electric appliance whose power supply is cut off.

An example of the liquid electrolyte which contains an organic solvent includes, for example, an electrolyte containing propylene carbonate as a solvent and tetraethylammonium perchlorate as a solute. An electric double layer capacitor which employs this liquid electrolyte has a withstand voltage of 2.4 V, which is twice as high as that of the conventional electric double layer capacitors which employ the liquid electrolyte containing sulfuric acid. However, the electric conductivity of this electrolyte is about 0.01 S/cm, which is lower than that of the liquid electrolyte containing sulfuric acid by about two orders of magnitude. Due to these characteristics, such a liquid electrolyte containing an organic solvent is used, for example, as a power supply for a backup memory in a compact electronic appliance (Ichiro Tanahashi et el., Carbon, Vol. 29, No. 7, p. 1033, 1991).

However, these liquid electrolytes can leak from such a capacitor as mentioned above. Therefore, a capacitor utilizing a solid polymer electrolyte which has substantially no possibility of leakage is now proposed.

Examples of the uses of the solid polymer electrolyte include an electric double layer capacitor which uses, as an electrolyte, a mixture of polyvinyl alcohol and a lithium salt such as lithium perchlorate, etc. in polyvinyl alcohol and has an electrode produced by soaking porous carbon with the electrolyte (J. Power Sources, 36, p. 87, 1991); and an electric double layer capacitor which uses, as an electrolyte, a mixture of cross-linked polyethylene oxide and an alkaline metal salt such as lithium perchlorate and has an electrode produced by mixing the electrolyte with activated carbon (Japanese Laid-Open Patent Publication No. 2-39513). However, when an electrochemical device is thus produced by using an electrolyte including an alkaline metal salt such as a lithium salt, it is necessary to completely remove moisture from the other structural materials to be used. It is especially difficult to completely remove moisture from porous carbon, that is, a material for an electrode, and to fabricate an electrochemical device while keeping the porous carbon in a completely dry state. Therefore, such a solid polymer electrolyte has not yet been practically fabricated or used.

Moreover, such a solid electrolyte has a problem of deterioration due to ambient moisture. A thin device can be produced generally by using a solid electrolyte. Such a thin device is generally sealed with a metal foil such as an aluminum foil whose surface is coated with an insulating sheet made of polypropylene, etc. When the above-mentioned electrolyte using a lithium salt is sealed in this manner and the obtained device is allowed to stand, for example, at a temperature of 60° C. and a humidity of 90%, the performance of the device starts to degrade after about 2 months. This appears to be due to moisture gradually entering the inside of the device through the sealing material.

In order to solve this problem, the use of an ammonium salt, which is the same kind of ammonium salt that is used in the above-mentioned liquid electrolyte made of an organic solvent, has been taken into consideration. It is, however, known that an ionic conductive polymer electrolyte in which an ammonium salt has been dissolved generally has an extremely low ionic conductivity (S. Chandra et al., Solid State Ionics, 40/41 (1990) p. 651). The inverse number of the ionic conductivity of an electrolyte used for constituting a capacitor is in proportion to the electric resistivity of the capacitor. Therefore, when the ionic conductivity of the electrolyte is too small, the electric resistivity of the capacitor is too large to output a sufficiently large current. As a result, such a capacitor can not be practically used.

A salt used in an electrolyte for an electric double layer capacitor needs to have an ionic radius as small as possible because the ions of such a salt are required to enter micropores with a size of about several tens angstroms in porous carbon such as activated carbon, that is, the material for the electrode. As is well known, however, it is difficult to dissolve a salt having an anion and a cation with a smaller ionic radius in a base polymer.

In order to obtain a polymer electrolyte with a high ionic conductivity by using an ammonium salt, a base polymer and an ammonium salt should be carefully selected, considering the foregoing factors of the ionic conductivity, the ionic radius, etc. But a specific electrolyte having practicable electric characteristics has not been developed as yet.

An attempt to use a solid polymer electrolyte in other electrochemical devices such as an electrolytic capacitor and a lithium secondary battery which is different from the electric double layer capacitor has been made.

The electrolytic capacitor is used as a device in an electric circuit, and generally comprises a positive electrode, a dielectric layer, an electrolytic layer and a negative electrode. The positive and negative electrodes are made of a metal such as aluminum and stainless steel. The dielectric layer is made of a metal oxide such as $Al_2O_3$. The electrolytic layer is, as in the electric double layer capacitor, obtained by soaking a separator with a liquid electrolyte.

The lithium secondary battery is used as a rechargeable power supply, and generally has a laminate structure comprising a current collector, a positive electrode, an electrolytic layer, a negative electrode and another current collector. The positive electrode is obtained by applying a mixture of $LiCoO_2$ as an active material in the positive electrode, a binder resin, and an electrically conductive material such as acetylene black on the current collector made of a metal and by heat-treating the resultant current collector. The electrolytic layer is obtained by soaking a separator with a liquid electrolyte. The negative electrode can be categorized within the following types: one produced from a metal; one produced by using lithium as a negative electrode active material in the same manner as in the positive electrode; and one produced from graphite.

Generally, such a laminate structure is provided with a terminal on its positive electrode or current collector, rolled up and put in a container to be used as an electric double layer capacitor, an electrolytic capacitor or a lithium secondary battery.

The electrochemical devices such as the electrolytic capacitor and the lithium secondary battery are also expected to attain a compact size and a long life by using the solid polymer electrolyte. However, a specific electrolyte for such electrochemical devices having practicable electric characteristics has not been proposed as yet.

SUMMARY OF THE INVENTION

The ionic conductive polymer electrolyte of this invention comprises a polymer having ether type oxygen in the structure and a plasticizer, wherein the plasticizer is at least one selected from the group consisting of compounds represented by the following general Formulas I, II, III, IV and V:

Formula I:

$$HO-(C_2H_4O)_n-H$$

wherein n is 2, 3, 4 or 5;
Formula II:

$$RO-(C_2H_4O)_n-H$$

wherein R is $CH_3$, $C_2H_5$, $C_3H_7$ or $C_4H_9$; and n is 3, 4 or 5;
Formula III:

$$R_1O-(C_2H_4O)_n-R_2$$

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;
Formula IV:

$$R_1O-(C_2H_4O)_n-(C_3H_6O)_m-H$$

wherein n+m is 2, 3, 4 or 5, and $R_1=CH_3$, $C_2H_5$, $C_3H_7$ or $C_4H_9$; and
Formula V:

$$R_1O-(C_2H_4O)_n-(C_3H_6O)_m-R_2$$

wherein n+m is 2, 3, 4, or 5 and $R_1=R_2=CH_3$.

In one embodiment, the plasticizer is at least one selected from the group consisting of compounds represented by the following Formulas III and V:

Formula III:

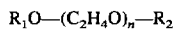

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6; and Formula V:

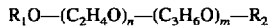

wherein n+m is 2, 3, 4, or 5 and $R_1=R_2=CH_3$.

In one embodiment, the polymer is selected from the group consisting of the following: a polymer represented by the following Formula VI; a polymer having a structure in which hydrogen at a terminal of a polymer represented by the following Formula VI is substituted with a substituent having a polymerizable double bond; and a cross-linked polymer obtained by cross-linking a polymer represented by the following Formula VI:

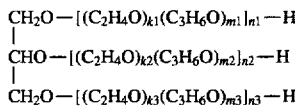

Formula VI:

wherein k1, k2, k3, m1, m2, m3, n1, n2 and n3 are positive integral numbers, respectively; and $(k_1+m_1) \times n_1$, $(k_2+m_2) \times n_2$ and $(k_3+m_3) \times n_3$ are independently 2 to 50.

Alternatively, the ionic conductive polymer electrolyte according to the present invention comprises a polymer having ether type oxygen in the structure, a plasticizer and an ammonium salt, wherein the plasticizer is at least one selected from the group consisting of monoethylene glycol, γ-butyrolactone, propylene carbonate and ethylene carbonate.

Alternatively, the present invention provides an electric double layer capacitor comprising a pair of electrodes, an electrolytic layer and a current collector. The pair of the electrodes are made of activated carbon and the above-mentioned ionic conductive polymer electrolyte, the pair of electrodes are disposed opposing each other having the electrolytic layer sandwiched therebetween, and the electrolytic layer is made of an ionic conductive polymer electrolyte having, as a charge carrier, an ion which is the same kind of ion as the moving ion in the ionic conductive polymer electrolyte used in the electrodes.

Alternatively, the present invention provides an electrolytic capacitor comprising an electrolytic layer including the above-mentioned polymer electrolyte, a dielectric layer including a metal oxide, and an electric conductive electrode.

Alternatively, the present invention provides a lithium secondary battery comprising an electrolytic layer including the above-mentioned ionic conductive polymer electrolyte, a positive electrode and a negative electrode.

Thus, the invention described herein makes possible the advantages of (1) providing a solid polymer electrolyte which exhibits excellent characteristics when used at a low temperature, and which is hardly degraded when stored at a high temperature and which has a high reliability even after being stored for a long time; and (2) providing an electric double layer capacitor, an electrolytic capacitor and a lithium secondary battery by utilizing the solid polymer electrolyte.

These and other advantages of the present invention will become apparent to those skilled in the art upon reading and understanding the following detailed description with reference to the accompanying figures.

BRIEF DESCRIPTION OF THE DRAWINGS

FIG. 8 shows a change with time in the capacity when the electric double layer capacitors according to the present invention are kept at a high temperature.

FIG. 9 is one typical schematic view of an electrolytic capacitor according to the present invention.

FIG. 10 is a schematic view of a coating apparatus used to form a film of a solid electrolyte in the electrolytic capacitor of FIG. 9.

FIG. 11 shows a change with time in the tangent δ when the electrolytic capacitor according to this invention and the conventional electrolytic capacitor are kept at a high temperature.

DESCRIPTION OF THE PREFERRED EMBODIMENTS

Figure 1:
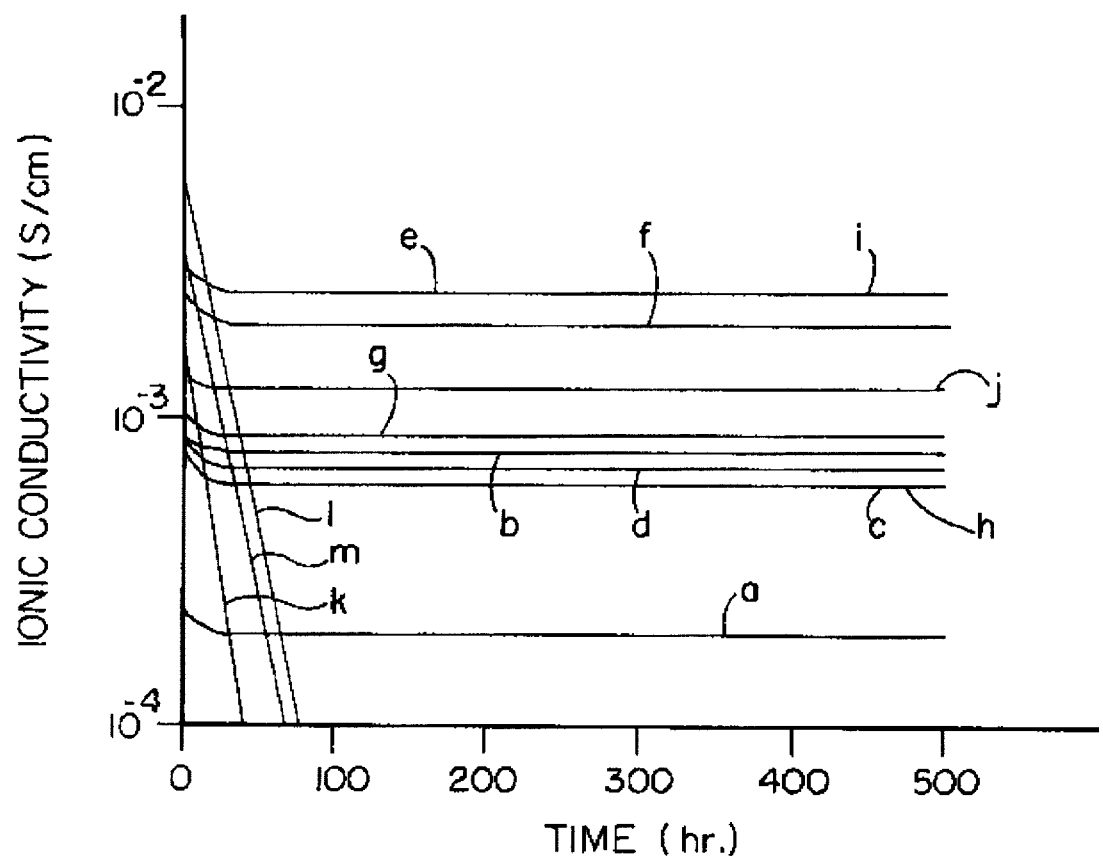
FIG. 1 shows a change with time of the ionic conductivity of electrolytes according to the present invention.

A base polymer to be used in an ionic conductive polymer electrolyte according to the present invention is a polymer having ether type oxygen in its structure. A preferable polymer has a polyether moiety, for example, polyoxyelkylene, as a skeleton structure. The polymer can be in the shape of a normal chain or a branched chain, and preferably has one branch. The polyether moiety can be a homopolymer or a copolymer. The copolymer herein includes a multiple copolymer such as a terpolymer. The copolymer herein can be an alternating copolymer, a random copolymer or a block copolymer. A preferable example of the polyether moiety is a random copolymer of polyoxyethylene and polyoxypropylene. The polyoxypropylene can be n-oxypropylene or iso-oxypropylene. The degree of polymerization of the polyether moiety is 2 to 200, and preferably 40 to 100. More preferably, the polyether moiety has, as a skeleton structure, polyether polyol having a structure represented by the following general Formula VI:

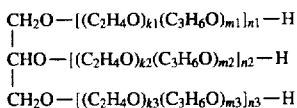  Formula VI wherein k1, k2, k3, m1, m2, m3, n1, n2 and n3 are positive integral numbers, respectively; and $(k_1+m_1) \times n_1$, $(k_2+m_2) \times n_2$, and $(k_3+m_3) \times n_3$ are independently from 2 to 50, and preferably 15 to 30.

The polyether polyol can be obtained by reacting epoxy compounds with glycerine while using a basic catalyst by a method, for example, disclosed in Japanese Laid-Open Patent Publication No. 4-68064. The production method for the polyether polyol is not limited to this.

The base polymer to be used in the ionic conductive polymer electrolyte according to this invention can have a polymerizable double bond at its terminal. An unlimited example of the polymerizable double bond includes a double bond of an acryloyl group or a methacryloyl group existing at the terminal of the polymer. More preferably, the base polymer has a structure in which hydrogen at the terminal of the polyether polyol represented by Formula VI is substituted with a substituent having a polymerizable double bond. The substitution can be performed by various known methods. For example, the polyether polyol represented by Formula VI and acrylic acid or methacrylic acid are dissolved in en organic solvent such as benzene, and air is blown into the mixture while using an acid such as sulfuric acid as a catalyst, thereby introducing an acryloyl or methacryloyl group into the terminal of the polyether polyol.

The base polymer to be used in the ionic conductive polymer electrolyte according to this invention can be a cross-linked polymer. Preferably, it can be a cross-linked polymer obtained by cross-linking the polymer having a polymerizable double bond at its terminal. The cross-linking reaction can be conducted by a known method such as irradiation with an electron beam, irradiation with ultraviolet light, or heating. Preferably, the acryloyl group or the methacryloyl group at the terminal is cross-linked by irradiation with an electron beam or ultraviolet light. Alternatively, a polyether polyol type polymer is mixed with an optional diisocyanate and the resultant mixture is heated, thereby attaining a cross-linkage by a urethane bond. Alternatively, a polymer with a structure in which a substituent having an isocyanate group is introduced into a terminal of polyether polyol is mixed with polyether polyol, and the mixture is heated to attain a urethane bond. The cross-linking method is not limited to the above. Such a three-dimensional cross-linkage is found to increase the electric conductivity of the resultant polymer electrolyte.

The ionic conductive polymer electrolyte of this invention comprises a plasticizer. The plasticizer herein corresponds to a solvent in an ordinary liquid electrolyte, but such a solvent is specifically called a plasticizer in a solid electrolyte. Therefore, the solvent in a solid electrolyte is herein referred to as the plasticizer. The plasticizer is at least one selected from the group consisting of the compounds represented by Formulas I, II, III, IV and V, monoethylene glycol, γ-butyrolactone, propylene carbonate and ethylene carbonate.

Formula I:

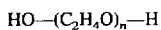

wherein n is 2, 3, 4 or 5;

Formula II:

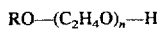

wherein R is $CH_3$, $C_2H_5$, $C_3H_7$ or $C_4H_9$; and n is 3, 4 or 5;

Formula III:

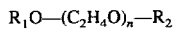

wherein $R_1=R_2=CH_3$, and n is 4, 5 or 6; $R_1=R_2=C_2H_5$, and n is 4, 5 or 6; $R_1=R_2=C_3H_7$, and n is 3, 4, 5 or 6; $R_1=R_2=C_4H_9$, and n is 2, 3, 4 or 5; or $R_1=CH_3$, $R_2=C_4H_9$, and n is 4, 5 or 6;

Formula IV:

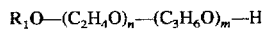

wherein n+m is 2, 3, 4 or 5, and $R_1=CH_3$, $C_2H_5$, $C_3H_7$ or $C_4H_9$; and Formula V:

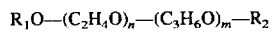

wherein n+m is 2, 3, 4, or 5 and $R_1=R_2=CH_3$.

More preferably, the plasticizer is at least one selected from the group consisting of compounds represented by the general Formulas I, II, III, IV and V. Most preferably, the plasticizer is at least one selected from the group consisting of compounds represented by Formulas III and V. The plasticizer can be optionally included in the electrolyte. Especially, the boiling point and the viscosity of the plasticizer represented by Formula I, II, III, IV or V can be adjusted by varying numbers n and/or m of a unit of alkylene oxide and the alkyl group $R_1$ and $R_2$ at the terminal. Therefore, selection of a plasticizer suitable for a desired application can provide an electrolyte with a long life and a high electric conductivity.

The ionic conductive polymer electrolyte according to this invention can further include various salts. Preferably, the salt is at least one selected from the group consisting of ammonium salts, phosphonium salts and lithium salts. When the ionic conductive polymer electrolyte includes, as a plasticizer, at least one selected from the group consisting of monoethylene glycol, γ-butyrolactone, propylene carbonate and ethylene carbonate, an ammonium salt is preferably included.

Preferable examples of the ammonium salts include quaternary ammonium borate such as tetrabutyl-ammonium borate; quaternary ammonium phosphate such as tetrabutylammonium phosphate; ammonium carboxylate such as ammonium borodisalicylate, ammonium γ-resorcylate, ammonium adipate, ammonium geranate, ammonium 1,6-decandicarboxylate, ammonium azelate, and ammonium benzoate; quaternary ammonium carboxylate, for example, tetraalkylammonium carboxylate such as tetraethylammonium benzoate, tetrabutylammonium benzoate, tetraethylammonium maleate, tetrabutylammonium maleate and tetraethylammonium phthalate; and tetraalkylammonium including $CF_3SO_3$, $ClO_4$, $BF_4$ or $PF_6$ as an anion such as tetrabutylammonium trifluoromethanesulfonate, tetraethylammonium perchlorate, tetramethylammonium tetrafluoroborate, tetraethylammonium tetrafluoroborate, tetrapropylammonium tetrafluoroborate, tetrabutylammonium tetrafluoroborate, tetramethylammonium hexafluorophosphate, tetraethylammonium hexafluorophosphate, tetrapropylammonium hexafluorophosphate, and tetrabutylammonium hexafluorophosphate.

Preferable examples of the phosphonium salts include tetraalkylphosphonium carboxylate such as tetraethylphosphonium phthalate; and tetraalkyl phosphonium salt having $CF_3SO_3$, $ClO_4$, $BF_4$ or $PF_6$ as an anion such as tetraethylphosphonium trifluoromethanesulfonate and tetrabutylphosphonium tetrafluoroborate.

Preferable examples of the lithium salts include $LiBF_4$ and $LiPF_6$.

An ionic conductive polymer electrolyte having an electric conductivity required for a practical use, and an unusually high boiling point and a low vapor pressure can be produced from a combination of the polymer, the plasticizer and the salt described above. Accordingly, degradation of the electrolyte when stored at a high temperature is prevented, and poor performance when used at a low temperature can be largely improved. A combination of the polymer, the plasticizer and the salt can be selected depending upon a desired application.

An electric double layer capacitor according to the present invention comprises a pair of electrodes, an electrolytic layer and a current collector. The pair of the electrodes include activated carbon and the ionic conductive polymer electrolyte according to the present invention. The electrolytic layer is formed by using the ionic conductive polymer electrolyte according to the present invention having, as a charge carrier, a moving ion which is the same kind as that in the polymer electrolyte used in the electrodes. The pair of electrodes are disposed opposing each other having the electrolytic layer sandwiched therebetween.

The polymer used in the ionic conductive polymer electrolyte in the electric double layer capacitor of this invention is preferably a cross-linked polymer derived from the compound represented by Formula VI.

The ionic conductive polymer electrolyte used in the electric double layer capacitor of this invention includes at least one plasticizer selected from the group consisting of the compounds represented by Formulas I, II, III, IV and V, monoethylene glycol, γ-butyrolactone, propylene carbonate and ethylene carbonate. Preferably, the plasticizer is at least one selected from the group consisting of monoethylene glycol, diethylene glycol, triethylene glycol, tetraethylene glycol, polyalkylene glycol dimethylether, γ-butyrolactone, propylene carbonate and ethylene carbonate.

The ionic conductive polymer electrolyte used in the electric double layer capacitor of this invention further comprises at least one salt selected from the group consisting of ammonium salts and phosphonium salts. When at least one plasticizer selected from the group consisting of monoethylene glycol, γ-butyrolactone, propylene carbonate and ethylene carbonate is included as the plasticizer, the ionic conductive polymer electrolyte comprises an ammonium salt.

Preferable examples of the ammonium salts included in the ionic conductive polymer electrolyte include ammonium carboxylate such as ammonium adipate, ammonium azelate, ammonium benzoate and ammonium γ-resorcylate; tetraalkylammonium carboxylate such as tetraethylammonium benzoate and tetrabutylammonium maleate; and tetraalkylammonium salt having $CF_3SO_3$, $ClO_4$, $BF_4$ or $PF_6$ as an anion such as tetrabutylammonium trifluoromethanesulfonate, tetraethylammonium perchlorate, tetramethylammonium tetrafluoroborate, tetraethylammonium tetrafluoroborate, tetrapropylammonium tetrafluoroborate, tetramethylammonium hexafluorophosphate, tetraethylammonium hexafluorophosphate and tetrapropylammonium hexafluorophosphate.

Preferable examples of the phosphonium salts used in the ionic conductive polymer electrolyte include tetraalkylphosphonium carboxylate such as tetraethylphosphonium phthalate; and tetraalkylphosphonium salt having $CF_3SO_3$, $ClO_4$, $BF_4$ or $PF_6$ as an anion such as tetrabutylphosphonium tetrafluoroborate.

When weights of the polymer and the plasticizer used in the ionic conductive polymer electrolyte in the electric double layer capacitor according to the present invention are taken as A and B, respectively, B/A is preferably 1 or more and 3 or less ($1 \leq B/A \leq 3$).

The activated carbon used in the electrodes has preferably a specific surface area of 1,000 $m^2$/g to 10,000 $m^2$/g and micropores with a size of 1.5 nm to 3 nm. When the micropores are too small, an anion and a cation produced by the salt to be used can not enter the pores. On the contrary, too large micropores unpreferably decrease the specific surface area of the activated carbon.

When weights of the activated carbon and the polymer used in the electrodes are taken as X and Y, respectively, X/Y is preferably larger than 0.5 and smaller than 1.5 ($0.5 < X/Y \leq 1.5$). By defining the ratio of the activated carbon and the polymer within this range, electric resistivity of the electrodes can be decreased and the charge-discharge characteristics of the capacitor can be improved.

The electric double layer capacitor according to the present invention can be produced, for example, by the following method: Activated carbon and the above described polymer electrolyte of this invention are mixed to form an electrode sheet. An electrolytic sheet is formed by using the same kind of the electrolyte as used in the electrode. Then, the electrolytic sheet is sandwiched between two electrode sheets. A current collector sheet is adhered by pressure to each outside surface of the electrode sheets. Alternatively, first, an electrolytic solution for an electrode including activated carbon and the polymer electrolyte according to this invention is coated on a current collector sheet and dried to obtain an electrode layer. Then, an electrolytic solution for an electrolytic layer including the same polymer electrolyte is coated on the electrode layer and dried to obtain a laminate sheet. Two laminate sheets are adhered with the surfaces bearing the electrolytic layer opposing each other, thereby attaining the electric double layer capacitor according to this invention. In the above-mentioned steps of forming each of the sheets or layers (including the step of drying the electrolytic solution), the ionic conductive polymer electrolyte is cured by irradiation with electron beams, a heat-treatment or the like, if necessary. The thus obtained electric double layer capacitor can be optionally rolled up together with a separator made of an insulator such as cloth or polypropylene, and sealed with a sealing material such as a resin and/or contained in a container made from a metal such as aluminum.

In a conventional electric double layer capacitor using a liquid electrolyte, activated carbon is required to be bonded with a binder in forming an electrode. A charge capacity of an electric double layer capacitor is generally in proportion to a surface area of the activated carbon used in the capacitor. Since a resin used as a binder in the conventional capacitor is not electrically conductive, portions connected by the binder on the surface of the activated carbon do not contribute to the charge capacity. On the contrary, in the electric double layer capacitor using the solid polymer electrolyte of this invention, the activated carbon can be bonded by the solid polymer electrolyte and there is no need to use a binder. As a result, the obtained capacitor can attain a larger capacity. Moreover, since this capacitor uses the solid polymer electrolyte, the electrolyte neither leaks nor evaporates as in the conventional capacitor, resulting in a longer life when stored at a high temperature.

As a result of the studies of the base polymer, the plasticizer and the salt constituting the polymer electrolyte, the present invention provides an electric double layer capacitor having a practical electric characteristic and an extremely high reliability when stored for a long period of time. The ionic conductive polymer electrolyte of the present invention has an ionic conductivity as high as that of a conventional polymer electrolyte using a lithium salt. Moreover, the ionic conductive polymer electrolyte of this invention does not degrade due to moisture, although the conventional electrolyte using a lithium salt is easily degraded with moisture.

The electrolytic capacitor according to the present invention comprises an electric conductive electrode, a dielectric layer which includes a metal oxide and an electrolytic layer. The electrolytic layer is made of the ionic conductive polymer electrolyte according to this invention.

The electrolytic layer in the electrolytic capacitor according to this invention includes an ionic conductive polymer electrolyte, which comprises a polymer and a plasticizer. The polymer is preferably a cross-linked polymer derived from the compound represented by the forgoing Formula VI.

The ionic conductive polymer electrolyte used in the electrolytic capacitor of this invention includes at least one plasticizer selected from the group consisting of compounds represented by Formulas I, II, III, IV and V.

The ionic conductive polymer electrolyte used in the electrolytic capacitor of this invention further includes at least one ammonium salt selected from the group consisting of quaternary ammonium borate, quaternary ammonium phosphate, ammonium carboxylate such as ammonium adipate, ammonium azelate, ammonium borodisalicylate, ammonium 1,6-decandicarboxylate and ammonium geranate, and quaternary ammonium carboxylate such as tetraethylammonium maleate and tetraethylammonium phthalate.

The electrolytic capacitor according to the present invention can be produced, for example, by the following method: Surfaces of a positive electrode made of a metal foil such as an aluminum foil are oxidized by using an aqueous solution of boric acid to form a dielectric layer made of a metal oxide. An electrolytic solution including the above described polymer electrolyte of this invention is coated on the surface of the dielectric layer and dried to form an electrolytic layer. A negative electrode made of a metal foil which is the same kind as that used in the positive electrode is adhered by pressure onto the electrolytic layer to obtain the electrolytic capacitor of this invention. In forming the electrolytic layers, the ionic conductive polymer electrolyte is cured by irradiation with electron beams, a heat-treatment or the like, if necessary. The electrolytic capacitor can be optionally rolled up together with a separator made of an insulator such as cloth and polypropylene, and sealed with a sealing material such as a resin or contained in a container made of a metal such as aluminum.

By using the above-mentioned compounds, an electrolytic capacitor with a sufficiently high withstand voltage and a low impedance can be provided. Such an electrolytic capacitor can attain a longer life when stored at a high temperature and an improved performance when used at a low temperature.

The lithium secondary battery according to this invention comprises a positive electrode, an electrolytic layer and a negative electrode. The electrolytic layer is made of the ionic conductive polymer electrolyte according to this invention.

The electrolytic layer in the lithium secondary battery of this invention includes an ionic conductive polymer electrolyte, which comprises a polymer. The polymer is preferably a cross-linked polymer derived from the compound represented by Formula VI.

The ionic conductive polymer electrolyte used in the lithium secondary battery of this invention includes at least one plasticizer selected from the group consisting of compounds represented by Formulas III and V, and further includes a lithium salt. Preferable examples of the lithium salts include $LiBF_4$ and $LiPF_6$.

The lithium secondary battery of this invention can be produced, for example, by the following method: A mixture of a solution for a positive electrode including the above-mentioned polymer electrolyte of this invention, an electric conductive substance such as acetylene black and an active material such as $LiCoO_2$ is applied onto a substrate and dried to obtain a positive electrode sheet. A mixture of electrolytic solution for a negative electrode including the polymer electrolyte which is the same kind as that used in the positive electrode, graphite and an electric conductive substance such as acetylene black is applied onto a substrate and dried to obtain a negative electrode sheet. One surface of each of the positive and negative sheets is coated with a solution including the polymer electrolyte which is the same kind as that used in the electrode and dried to form an electrolytic layer. The positive and negative sheets are adhered by pressure with the surfaces bearing the electrolytic layers opposing each other to obtain the lithium secondary battery of this invention. In forming each of the layers, the ionic conductive polymer electrolyte is cured by irradiation with electron beams, a heat-treatment or the like, if necessary. The lithium secondary battery can be optionally rolled up together with a separator made of an insulator such as cloth and polypropylene, and sealed with a sealing material such as a resin or contained in a container made of a metal such as aluminum.

By using the above-mentioned compounds, a lithium secondary battery having a longer life when stored at a high temperature and an improved performance when used at a low temperature can be provided.

EXAMPLES (Example 1.1)

A base polymer was obtained by substituting a hydrogen atom at a molecular terminal of a polymer represented by Formula VI with an acryloyl group:

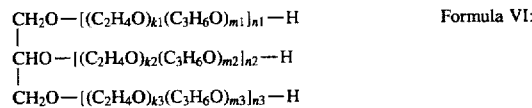

Formula VI:

wherein $(k_1+m_1) \times n_1$, $(k_2+m_2) \times n_2$ and $(k_3+m_3) \times n_3$ are approximately 25 on an average, respectively.

A mixture of 100 g of the obtained base polymer, 200 g of triethylene glycol as a plasticizer and 40 g of ammonium borodisalicylate as a salt was poured into a vat made of stainless steel and spread so as to have a thickness of 0.5 mm. The mixture was cured by irradiation with electron beams in an atmosphere of nitrogen under the conditions of an accelerating voltage of 750 keV and an exposure of 1 Mrad to obtain an ionic conductive polymer electrolyte sheet according to the present invention.

(Examples 1.2 through 1.10)

Ionic conductive polymer electrolyte sheets according to the present invention were obtained in the same manner as in Example 1.1 except that the kinds and amounts of plasticizers and salts to be used were as shown in Table 1 below.

TABLE 1

| Example | Plasticizer (g) | Salt (g) |
| --- | --- | --- |
| 1.1 | $HO(C_2H_4O)_3H$ (200) | Ammonium borodisalicylate (40) |
| 1.2 | $CH_3O(C_2H_4O)_3H$ (200) | Ammonium γ-resorcylate (40) |
| 1.3 | $C_4H_9O(C_2H_4O)_2H$ (400) | $(C_4H_9)_4NBF_4$ (40) |
| 1.4 | $CH_3O(C_2H_4O)_4CH_3$ (200) | Tetrabutylammonium benzoate (20) |
| 1.5 | $C_4H_9O(C_2H_4O)_3C_4H_9$ (500) | $LiBF_4$ (24) |
| 1.6 | $CH_3O(C_2H_4O)_5C_4H_9$ (400) | $LiPF_6$ (30) |
| 1.7 | $CH_3O(C_2H_4O)_3(C_3H_6O)_3H$ (400) | $(C_2H_5)_4PCF_3SO_3$ (63) |
| 1.8 | $CH_3O(C_2H_4O)_2(C_3H_6O)_2CH_3$ (400) | Ammonium adipate (50) |
| 1.9 | $C_4H_9O(C_2H_4O)(C_3H_6O)C_4H_9$ (400) | Tetrabutylammonium borate (50) |
| 1.10 | $CH_3O(C_2H_4O)_2(C_3H_6O)C_4H_9$ (400) | Tetrabutylammonium phosphate (50) |

(Comparative Examples 1.1 through 1.3)

Conventional liquid electrolytes used in an electrolytic capacitor, an electric double layer capacitor or a lithium secondary battery were produced by mixing respective solvents and salts listed in Table 2 below.

TABLE 2

| Comparative Example | Solvent (ml) | Salt (g) |
| --- | --- | --- |
| 1.1 | Ethylene glycol (1,000) | Ammonium 1,6-decandicarboxylate (100) |
| 1.2 | Propylene carbonate (1,000) | $(C_2H_5)_4NBF_4$ (100) |
| 1.3 | Propylene carbonate (1,000) | $LiBF_4$ (100) |

The polymer electrolytes obtained in Examples 1.1 through 1.10 and the liquid electrolytes obtained in Comparative Examples 1.1 through 1.3 were measured for the ionic conductivity at temperatures of 20° C. and −10° C. by a known complex impedance method. The results are shown in Table 3.

TABLE 3

| Example/ | Conductivity (mS/cm) | |
| --- | --- | --- |
| Comparative Example | at 20° C. | at −10° C. |
| Example | | |
| 1.1 | 0.4 | 0.1 |
| 1.2 | 1.0 | 0.3 |
| 1.3 | 0.8 | 0.2 |
| 1.4 | 1.0 | 0.2 |
| 1.5 | 3.0 | 0.7 |
| 1.6 | 2.5 | 0.6 |
| 1.7 | 1.0 | 0.2 |
| 1.8 | 0.8 | 0.2 |
| 1.9 | 3.0 | 1.0 |
| 1.10 | 1.5 | 0.5 |
| Comparative Example | | |
| 1.1 | 2.3 | 0.2 |

TABLE 3-continued

| Example/ | Conductivity (mS/cm) | |
| --- | --- | --- |
| Comparative Example | at 20° C. | at −10° C. |
| 1.2 | 7.0 | 0.5 |
| 1.3 | 5.0 | 0.5 |

Further, these polymer electrolytes and liquid electrolytes were allowed to stand unsealed in an atmosphere of nitrogen at a temperature of 100° C. to observe any change in the ionic conductivity with time in each electrolyte. The results are shown in FIG. 1.

As is shown in Table 3 and FIG. 1, the ionic conductive polymer electrolytes according to this invention have a practical ionic conductivity of 0.1 S/cm or more, and the ionic conductivity does not decrease when the polymer electrolytes are used at a low temperature. Thus, the polymer electrolytes according to this invention were found to attain an unusually high reliability.

In Table 1, the plasticizer used in Example 1.1 is an example of one represented by Formula I. Similarly, those used in Examples 1.2 and 1.3 are represented by Formula II, those used in Examples 1.4 through 1.6 are represented by Formula III, that used in Example 1.7 is represented by Formula IV and those used in Examples 1.8 through 1.10 are represented by Formula V. Other plasticizers represented by any of Formulas I through V were also found to exhibit similar effects.

Moreover, a polymer represented by Formula VI was mixed with diisocyanate, and the resultant mixture was cured by heating at a temperature of 80° C. for 24 hours in an atmosphere of nitrogen to give another ionic conductive polymer electrolyte, which also exhibited similar effects.

(Example 2.1)

Figure 2:
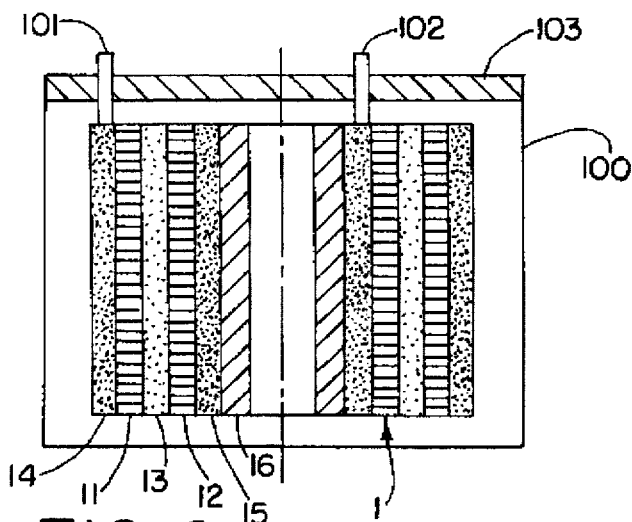
FIG. 2 is one typical schematic view of an electric double layer capacitor according to an example of the present invention.

FIG. 2 is a schematic sectional view of a typical electric double layer capacitor according to the present invention. The electric double layer capacitor has a capacitor element 1 which can be obtained by rolling up a lamination comprising a current collector 14 made of an aluminum foil, an electrode layer 11 made of activated carbon and an ionic conductive polymer electrolyte, an electrolytic layer 13 made of the same ionic conductive polymer electrolyte as used in the electrode layer, another electrode layer 12 and another current collector 15 together with a separator 16. In the electric double layer capacitor, the respective current collectors 14 and 15 are provided with terminals 101 and 102, respectively. The capacitor element 1 can be contained in a container 100 made of a metal such as aluminum and sealed with a sealing material 103 such as an epoxy resin. The current collector can be made of a metal such as stainless steel as well as the aluminum described above, but the materials are not limited to them. FIG. 2 shows a sectional view of only one lamination comprising a current collector 14, an electrode layer 11, an electrolytic layer 13, the electrode layer 12, the current collector 15 and the separator 16. But a plurality of such laminations are present in the actual electric double layer capacitor.

The electric double layer capacitor A was produced in the following manner: One hundred grams of activated carbon with an average particle size of 2 μm, a specific surface area of 2,500 m$^2$/g and an average diameter of micropores of 20 angstroms, 50 g of a base polymer obtained by substituting with an acryloyl group a hydrogen atom at a molecular terminal of the polymer represented by Formula VI, wherein $(k_1+m_1) \times n_1$, $(k_2+m_2) \times n_2$, and $(k_3+m_3) \times n_3$ are approximately 25 on an average, respectively; 150 g of HO($C_2H_4O$)$_3$H as a plasticizer; 20 g of tetrabutylammonium trifluoromethanesulfonate as a salt; and 100 g of n-butanone were mixed by using a ball mill made of alumina, and mixed for 24 hours to obtain an electrolytic solution for an electrode. The solution herein includes a gel with a high viscosity and a dispersion. The electrode terminal is fixed on the current collector 14 (15) made of an aluminum foil with a thickness of 20 μm by spot welding. The electrolytic solution for an electrode was applied on the current collector 14 (15) by using a roll coater so as to form a layer with a thickness of 100 μm. The coated layer was cured with irradiating with electron beams with an accelerating voltage of 500 keV and an exposure of 4 Mrad to form the electrode layers 11 and 12.

The electrolytic layer 13 was produced as follows: One hundred grams of the same base polymer as used for the electrode layers 11 and 12, 300 g of HO($C_2H_4O$)$_3$H as a plasticizer and 40 g of tetrabutylammonium trifluoromethanesulfonate as a salt were mixed to obtain an electrolytic solution for an electrolytic layer. The electrolytic solution for an electrolytic layer was applied onto the surface of the electrode layers 11 and 12 by using a wire rod to form a layer with a thickness of 50 μm. The coated layer was cured by the irradiation with electron beams with an accelerating voltage of 180 keV and an exposure of 1 Mrad to form an electrolytic layer.

The thus obtained sheet was cut into a size of 2.5 cm×40 cm. Two cut sheets were adhered by pressure to each other with the surfaces bearing the electrolytic layer opposing each other. The separator 16 made of polypropylene was placed on the resultant sheet, which were rolled up together, to give the capacitor element 1. The element 1 was placed in an aluminum container 100 and sealed with the sealing material 103 made of an epoxy resin. Thus, the electric double layer capacitor A was obtained. The electric double layer capacitor A was subjected to aging by applying a voltage of 2.3 V for 5 hours at a temperature of 100° C. and shorting for 1 hour.

(Comparative Example 2.1)

A conventional electric double layer capacitor B was produced as follows: A mixture of 100 g of activated carbon with an average particle size of 2 μm, a specific surface area of 2,500 m$^2$/g and micro pores with an average diameter of 20 angstroms; 10 g of acetylene black as an electric conductive agent; and 200 g of a methanol solution in which polytetrafluoroethylene (5 wt %) was dispersed was sufficiently stirred to obtain an electrolytic solution for an electrode. The electrolytic solution for an electrode was applied on a current collector made of an aluminum foil which is the same kind as that used in Example 2.1 by a using roll coater to form a layer with a thickness of 100 μm, and cured by heating for 13 hours at a temperature of 100° C. in an atmosphere of nitrogen to form an electrode layer.

The thus obtained sheet was cut into a size of 2.5 cm ×40 cm. A separator made of polypropylene with a porosity of 40% and a thickness of 40 μm was sandwiched between the electrode layers of the two cut sheets. Another separator was disposed on one of the current collectors. The thus obtained lamination was rolled up. The rolled up sheet was placed in an aluminum container. A conventional electrolyte comprising propylene carbonate including 0.8 mol/l of ($C_2H_5$)$_4$NBF$_4$ was poured into the container, which was then subjected to a vacuum impregnation for 1 minute with a pressure of 5 Torr. Then, it was sealed with an epoxy resin to obtain the electric double layer capacitor B.

The electric double layer capacitor B was subjected to aging by applying a voltage of 2.3 V for 24 hours at a temperature of 50° C. and shorting for 1 hour in the same manner as in Example 2.1.

These two electric double layer capacitors A and B produced in Example 2.1 and Comparative Example 2.1 were evaluated for the capacity and the temperature characteristics of the internal resistance. The results are respectively shown in FIGS. 3 and 4. The capacity was measured as follows: A voltage of 2.3 V was applied to each capacitor for 30 minutes at respective temperatures. The capacitor was then discharged at a constant current of 10 mA. At this point, the quantity of electricity (coulomb) discharged until an element voltage became 0 V was measured. The measured value was divided by 2.3 V, that is, the initial applied voltage, to obtain a value indicating the capacity. The internal resistance was obtained by measuring an impedance at a frequency of 1 kHz.

Figure 3:
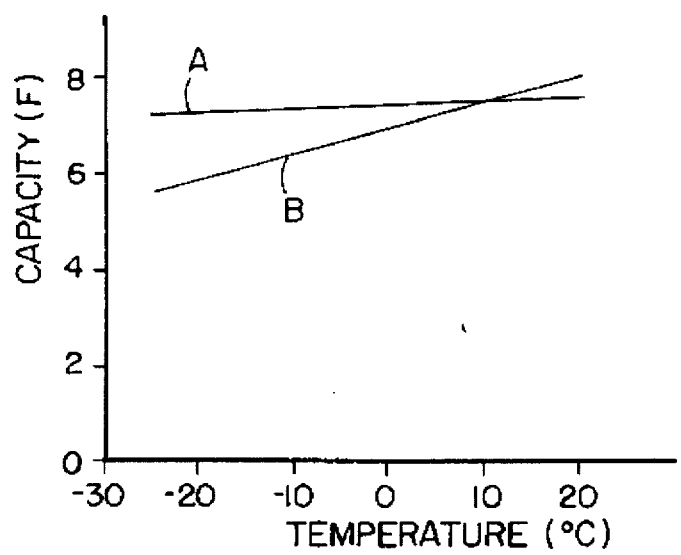
FIG. 3 is a graph showing the relationship between temperature and the capacity of an electric double layer capacitor according to this invention and a conventional electric double layer capacitor.

FIG. 3 is a graph showing the relationship of the capacity against temperature. As is obvious from this graph, the capacity of the electric double layer capacitor B obtained in Comparative Example 2.1 at a temperature of −25° C. is decreased by about 30% or more from that at a temperature of 20° C. On the contrary, the capacity of the electric double layer capacitor A obtained in Example 2.1 is decreased by less than 10%.

Figure 4:
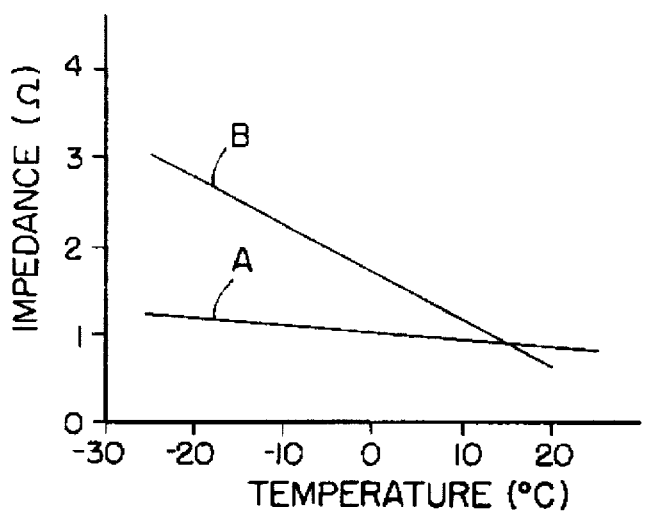
FIG. 4 is a graph showing the relationship between temperature and the impedance of the electric double layer capacitor according to this invention and the conventional electric double layer capacitor.

FIG. 4 is a graph showing the relationship of the impedance against temperature. The impedance of the electric double layer capacitor B at a temperature of −25° C. is about three times as high as that at a temperature of 20° C. On the contrary, the impedance of the electric double layer capacitor A is increased by less than 50%.

Figure 5:
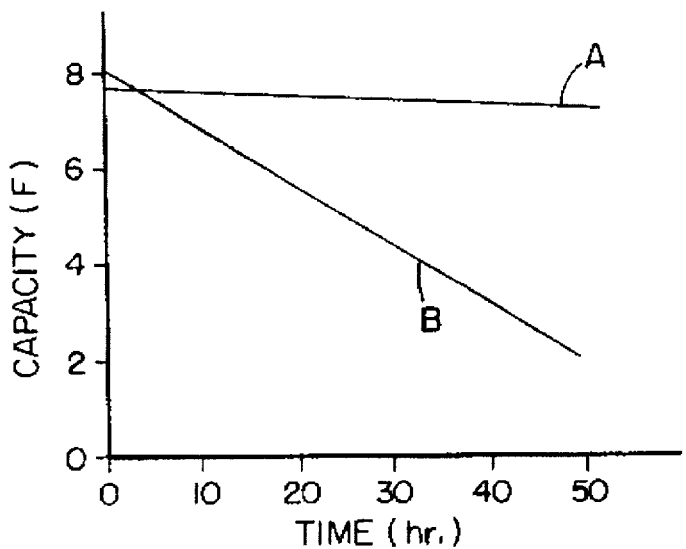
FIG. 5 shows a change with time in the capacity when the electric double layer capacitor according to this invention and the conventional electric double layer capacitor are kept at a high temperature.

Moreover, in order to test the shelf life at a high temperature, the electric double layer capacitors A and B from which the epoxy resin sealings were removed were allowed to stand in an atmosphere of nitrogen at a temperature of 85° C. A change in the capacity during the test was observed. The results are shown in FIG. 5. As is obvious from FIG. 5, the electric double layer capacitor A has a much longer shelf life than the electric double layer capacitor B at a high temperature.

(Examples 2.2 through 2.8)

Electric double layer capacitors according to the present invention were produced in the same manner as in Example 2.1 except that the kinds and amounts of plasticizers and salts as shown in Table 4 were used. Each amount shown in Table 4 is that used per 10 g of each of the base polymers.

These electric double layer capacitors were tested for reliability when stored at a high temperature. The capacity and the impedance were measured in the same manner as in Example 2.1. The results are shown in Table 5. In Table 5, the capacity ratio is indicated as a ratio of the capacity after storing for 500 hours to the initial capacity, and the impedance ratio is indicated as a ratio of the impedance measured after storing the capacitor for 500 hours to the initial impedance. The electric double layer capacitor using a conventional liquid electrolyte obtained in Comparative Example 2.1 has a decreased capacity, which is a quarter of the initial capacity, after being stored for 50 hours at a temperature of 85° C. When the electric double layer capacitor was stored for a longer period of time, the liquid electrolyte evaporated and the measurement could not be conducted. On the contrary, the electric double layer capacitors of these Examples were found to have a much longer life at a high temperature.

TABLE 4

| Example | Plasticizer (g) | Salt (g) |
|---|---|---|
| 2.2 | $HO(C_2H_4O)_3H$ (10) | Ammonium adipate (2.5) |
| 2.3 | $CH_3O(C_2H_4O)_3H$ (10) | $(C_4H_9)_4PBF_4$ (2.0) |
| 2.4 | $C_4H_9O(C_2H_4O)_2H$ (10) | Tetraethylammonium perchlorate (0.8) |
| 2.5 | $CH_3O(C_2H_4O)_4CH_3$ (20) | Tetraethylphosphonium phthalate (4.0) |
| 2.6 | $C_4H_9O(C_2H_4O)_2C_4H_9$ (20) | Tetrabutylammonium maleate (5.0) |
| 2.7 | $C_4H_9O(C_2H_4O)_4CH_3$ (20) | Tetraethylammonium benzoate (4.0) |
| 2.8 | $CH_3O(C_2H_4O)(C_3H_6O)_2H$ (30) | $(C_4H_9)_4NCF_3SO_3$ (5.0) |

TABLE 5

| Example | Capacity Ratio | Impedance Ratio |
|---|---|---|
| 2.2 | 0.9 | 1.5 |
| 2.3 | 0.9 | 1.5 |
| 2.4 | 0.95 | 1.4 |
| 2.5 | 0.95 | 1.3 |
| 2.6 | 0.99 | 1.05 |
| 2.7 | 0.99 | 1.05 |
| 2.8 | 0.95 | 1.3 |

(Example 2.9)

Figure 6:
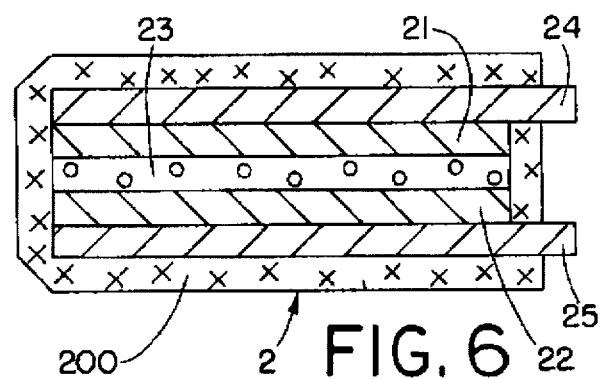
FIG. 6 is another typical schematic view of an electric double layer capacitor according to the present invention.

An electric double layer capacitor C according to the present invention having a different structure from that obtained in any of Examples 2.1 through 2.8 was produced. FIG. 6 shows a typical structure of this capacitor C. A current collector sheet 25, an electrode sheet 22, an electrolytic layer sheet another electrode sheet 21 and another current collector sheet 24 are laminated in this order. The obtained laminate is sealed with a sealing material 200. Terminals can be connected to the respective current collector sheets 24 and 25. Each of the electrode sheets 21 and 22 contains activated carbon and an ionic conductive polymer electrolyte. The electrolytic layer sheet contains the ionic conductive polymer electrolyte which is the same kind as that used in the electrode sheets 21 and 22. The current collector sheet 24 and 25 is made of a metal foil or a metal net. As a metal for the current collector sheet, aluminum and stainless steel can be used but the material is not limited to them. The sealing material is generally a sheet obtained by laminating one surface of a metal foil such as an aluminum foil with an electrically insulating film such as a polypropylene film. When a porous film made of an insulator such as polypropylene is used in forming the electrolytic layer sheet 23, the mechanical strength and short resistance of the electrolytic layer sheet 23 can be improved.

The electric double layer capacitor C was produced as follows: A base polymer was obtained by substituting with an acryloyl group a hydrogen atom at a molecular terminal of a polymer represented by the foregoing Formula VI, wherein $(k_1+m_1) \times n_1$, $(k_2+m_2) \times n_2$ and $(k_3+m_3) \times n_3$ are approximately 25 on an average, respectively. Ten grams of the obtained base polymer, 20 g of diethylene glycol as a plasticizer, 1.68 g of ammonium benzoate as a salt and 10 g of n-butanone were mixed, and the mixture was stirred to obtain an electrolytic solution for an electrolytic layer. The electrolytic solution for an electrolytic layer was poured into a vat made of stainless steel, spread into a thickness of 0.5 mm, and cured with irradiating electron beams with an accelerating voltage of 750 keV and an exposure of 3 Mrad in an atmosphere of nitrogen to obtain an electrolytic layer sheet 23.

Ten grams of activated carbon with an average particle size of 2 μm, a specific surface area of 2,500 $m^2/g$ and micropores with an average diameter of 2 nm, 10 g of the same kind of the base polymer as used in the electrolytic layer sheet, 20 g of diethylene glycol, 1.68 g of ammonium benzoate and 35 g of n-butanone were mixed by using a ball mill made of alumina, and ground for 24 hours to obtain an electrolyte solution for an electrode. The electrolyte solution for an electrode was poured into a vat made of stainless steel, spread into a thickness of 0.5 mm, and cured with irradiating electron beams with an accelerating voltage of 750 keV and an exposure of 8 Mrad in an atmosphere of nitrogen to obtain an electrode sheet 21 (22).

The electrode sheet 21 (22) was cut into a size of 5 cm×2 cm. The electrolytic layer sheet 23 was cut into a size of 5.2 cm×2.2 cm. The cut electrode sheet 21 (22) was adhered by pressure to each surface of the cut electrolytic layer sheet 23. The current collector sheet 24 (25) made of an aluminum foil with a thickness of 50 μm was further adhered by pressure to each electrode sheet 21 (22). Thus, the electrolytic layer sheet 23 was sandwiched between the two electrode sheets 21 and 22 and the current collector sheets 24 and 25. The obtained laminated sheet was then sealed with the sealing material 200 made of an aluminum foil bearing a layer of polypropylene with a thickness of 0.1 mm on one of the surfaces. The sealing was conducted by pressing of the sealing material for 5 seconds at a temperature of 170° C. Thus, an electric double layer capacitor C was obtained.

(Comparative Example 2.2)

A conventional electric double layer capacitor D using a lithium salt was produced as follows.

A base polymer was obtained by introducing a substituent having an isocyanate group into a polymer represented by the forgoing Formula VI at a molecular terminal. In Formula VI, $(k_1+m_1) \times n_1$, $(k_2+m_2) \times n_2$ and $(k_3+m_3) \times n_3$ are approximately 25 on an average, respectively. Four grams of the base polymer, 3.5 g of the original polymer represented by Formula VI, and 2.7 g of propylene carbonate including 1 mol/l of lithium perchlorate were mixed, and the mixture was stirred to obtain an electrolytic solution for an electrolytic layer. The electrolytic solution for an electrolytic layer was poured into a vat made of stainless steel and spread into a thickness of 0.5 mm.

Ten grams of activated carbon with an average particle size of 2 μm, a specific surface area of 2,500 $m^2/g$ and micropores with an average diameter of 2 nm, 3.5 g of the same kind of original polymer, 4 g of the same kind of base polymer, 2.7 g of propylene carbonate including 1 mol/l of lithium perchlorate, and 25 g of n-butanone were mixed, and the mixture was ground by using a ball mill made of alumina for 24 hours to obtain an electrolytic solution for an electrode. The electrolytic solution for an electrode was poured into a vat made of stainless steel and spread into a thickness of 0.5 mm.

The two kinds of the electrolytic solutions thus obtained were cured by keeping for 17 hours at a temperature of 70° C. in an atmosphere of nitrogen to obtain an electrolytic layer sheet and an electrode sheet. By using these sheets, the electric double layer capacitor D was produced in the same manner as in Example 2.9.

Figure 7:
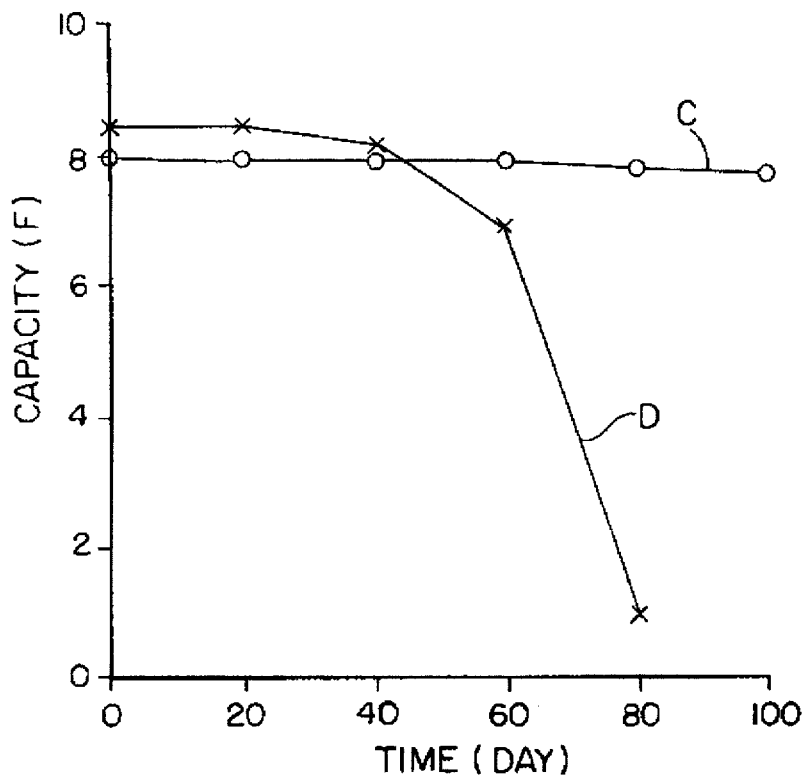
FIG. 7 shows a change with time in the capacity when the electric double layer capacitor according to this invention and the conventional double layer capacitor are kept at a high temperature.

The electric double layer capacitors C and D were evaluated for capacity when they were stored at a temperature of 60° C. and a humidity of 90%. The results are shown in FIG. 7. The capacity was obtained as follows: A voltage of 3 V was applied to each capacitor for 5 minutes at respective temperatures. The capacitor was then discharged at a constant current of 1 mA. At this point, the quantity of electricity (coulomb) discharged until an element voltage became 0 V was measured. The obtained value was divided by 3 V, that is, the initial applied voltage, to obtain a value indicating the capacity (F). In FIG. 7, the abscissa indicates a number of days for which each capacitor was kept at a temperature of 60° C. and a humidity of 90%, and the ordinate indicates the capacity. As is obvious from this graph, the capacity of the electric double layer capacitor D is rapidly decreased after about 2 months. On the contrary, the electric double layer capacitor C shows little degradation.

(Examples 2.10 through 2.19)

Electric double layer capacitors according to the present invention were produced in the same manner as in Example 2.9 except that the kinds and amounts of plasticizers and salts as shown in Table 6 were used. Each amount shown in Table 6 was that to be used per 10 g of each of the base polymers.

The electric double layer capacitors were evaluated in the same manner as in the evaluation of the capacitors C and D. The results are shown in FIG. 8. As is obvious from FIG. 8, similarly to the capacitor C, the electric double layer capacitors obtained in these Examples 2.10 through 2.19 exhibit an improved reliability as compared with the capacitor D obtained in Comparative Example 2.2.

TABLE 6

| Example | Salt (g) | Plasticizer (g) |
|---|---|---|
| 2.10 | $(CH_3)_4NBF_4$ (2.8) | Propylene carbonate (10) Ethylene carbonate (10) |
| 2.11 | $(CH_3)_4NPF_6$ (1.4) | Propylene carbonate (5) Ethylene carbonate (5) |
| 2.12 | $(C_2H_5)_4NBF_4$ (2.8) | γ-butyrolactone (15) |
| 2.13 | $(C_2H_5)_4NPF_6$ (3.5) | γ-butyrolactone (15) |
| 2.14 | $(C_2H_5)_4NBF_4$ (2.8) | Monoethylene glycol (20) |
| 2.15 | $(C_3H_7)_4NBF_4$ (3.5) | Triethylene glycol (20) |
| 2.16 | $(C_3H_7)_4NPF_6$ (4.2) | Polyethylene glycol (30) |
| 2.17 | Ammonium adipate (1.5) | Diethylene glycol (20) |
| 2.18 | Ammonium azelate (1.5) | Diethylene glycol (20) |
| 2.19 | Ammonium γ-resorcylate (1.5) | Diethylene glycol (20) |

(Examples 2.20 through 2.28)

In these Examples, various capacitors having activated carbon with various shapes and contents were produced, and differences in the performance of the capacitors depending upon the differences in the shapes and the contents of activated carbon were checked. Table 7 shows the specific surface area, the micropore size, and the weight ratio on the basis of the weight of the base polymer of the activated carbon to be used in each Example and the capacity of the resultant capacitor. The capacitors in these Examples were produced in the same manner by using the same materials as the electric double layer capacitor C obtained in Example 2.9 except for the kind and content of the activated carbon.

The weight ratio of the activated carbon on the basis of the weight of the base polymer is a value obtained as X/Y, when the weights of the activated carbon and the base polymer were taken as X and Y, respectively. The capacity was obtained as follows: A voltage of 3 V was applied to each capacitor for 5 minutes. The capacitor was then discharged at a constant current of 1 mA. At this point, the quantity of electricity (coulomb) discharged until the element's voltage became 0 V was measured. The obtained value was divided by 3 V, that is, the initial applied voltage, to obtain a value indicating the capacity (F). The capacities listed in Table 7 were measured after repeating this cycle 100 times.

From the results shown in Table 7, only the activated carbons having a micropore size of 1.5 nm or more contained in the polymer electrolyte in the proportion of the weight ratio of more than 0.5 provide a capacitor with a practical capacity. The specific surface area and the micropore size of the activated carbon can not be optionally and independently determined but almost definitely determined by the production conditions of the activated carbon.

TABLE 7

| Example | Specific Surface Area ($m^2$/g) | Micropore Size (nm) | Weight Ratio | Capacity (F) |
|---|---|---|---|---|
| 2.20 | 2500 | 2.0 | 0.4 | 0.2 |
| 2.21 | 2500 | 2.0 | 0.5 | 1.2 |
| 2.22 | 2500 | 2.0 | 0.6 | 5.2 |
| 2.23 | 2500 | 2.0 | 1.4 | 12.0 |
| 2.24 | 2500 | 2.0 | 1.5 | 13.0 |
| 2.25 | 800 | 1.0 | 1.0 | 0.2 |
| 2.26 | 1000 | 1.5 | 1.0 | 5.5 |
| 2.27 | 2000 | 2.0 | 1.0 | 6.5 |
| 2.28 | 800 | 1.0 | 1.4 | 0.2 |

(Example 3.1)

An aluminum electrolytic capacitor E using an aluminum electrode according to this invention was produced in this Example.

FIG. 9 shows a typical structure for this electrolytic capacitor. The electrolytic capacitor comprises a capacitor element 3 obtained by rolling up a lamination including a positive electrode sheet 31 made of a metal foil, a dielectric layer 34 formed on the surface of the positive electrode sheet 31, an electrolytic layer 33 made of an ionic conductive polymer electrolyte, a negative electrode sheet 32 made of the same kind of the metal foil as used for the positive electrode sheet 31 and a separator 35. The positive and negative electrode sheets 31 and 32 are provided with terminals 301 and 302, respectively. FIG. 9 is a sectional view of the aluminum electrolytic capacitor E. FIG. 9 shows a sectional view of only one lamination comprising a positive electrode sheet 31, a dielectric layer 34, an electrolytic layer 33, a negative electrode sheet 32 and a separator 35. But a plurality of such laminations are present in the actual electrolytic capacitor.

The aluminum electrolytic capacitor E was produced as follows: The terminal 301 was spot-welded on a surface of the positive electrode sheet 31 made of an aluminum foil with a thickness of 0.05 mm and a size of 3 cm×100 cm having etching pits with diameters of about 1 to 5 μm. The positive electrode sheet 31 was dipped in an aqueous solution including 80 g/l of boric acid at a temperature of 90° C. The aluminum on the surface portion was oxidized by using a current of 30 A for 15 minutes, thereby forming the dielectric layer 34 made of aluminum oxide. The other terminal 302 was also spot-welded onto a surface of the negative electrode sheet 32 made of the same kind of the aluminum foil as that used for the positive electrode sheet 31.

A base polymer was obtained by introducing a substituent having an isocyanate group into a polymer represented by Formula VI at a molecular terminal. In Formula VI, ($k_1$+

$m_1)\times n_1$, $(k_2+m_2)\times n_2$ and $(k_3+m_3)\times n_3$ are approximately 25 on an average, respectively. One hundred grams of the base polymer, 100 g of $CH_3O(C_2H_4O)_5CH_3$ as a plasticizer, 20 g of ammonium borodisalicylate as a salt and 200 g of n-butanone as a diluent were mixed and stirred to obtain an electrolytic solution for an electrolytic layer.

The dielectric layer 34 was coated with the electrolytic solution for an electrolytic layer by using a coating apparatus having a structure as shown in FIG. 10. The coating apparatus sprays a coating solution from a nozzle 41 over a substrate 44 by introducing the coating solution from an inlet 42 and an inert gas from a gas inlet 43. The substrate 44 is moved in a predetermined direction by a conveyor 45, thereby the coating solution is sprayed all over the substrate 44. The coating apparatus having a nozzle 41 with a diameter of the nozzle hole of 0.5 mm sprayed the electrolytic solution for an electrolytic layer in the vertical direction at a rate of 1 L/hr. under a nitrogen pressure of 3 kg/cm² over a substrate (the dielectric layer 34 on the positive electrode sheet 31 in this case). The nozzle was fixed at a position 10 cm above from the positive electrode sheet 31. The positive electrode sheet 31 was allowed to run at a constant rate of 10 cm/sec. in the horizontal direction by the conveyor 45. The spraying angle of the nozzle was 22°. In this manner, the electrolytic solution for an electrolytic layer was sprayed to form a layer with a thickness of 0.06 mm which varies within a range of 20% or less. The coated electrolytic layer was allowed to stand in air for 1 hour at a temperature of 30° C. to be half-dried to form the electrolytic layer 33. The negative electrode sheet 32 made of an aluminum foil was then adhered by pressure opposing the surface of the positive electrode sheet 31 bearing the electrolytic layer 33. The adhered electrode sheets 31 and 32 were allowed to stand in air for 3 hours at a temperature of 50° C. to form a lamination comprising the positive electrode sheet 31, the dielectric layer 34, the polymer electrolytic layer 33 and the negative electrode sheet 32. A separator 35 made of Manila fiber was placed on the resultant lamination, which was then rolled up together, thereby producing the aluminum electrolytic capacitor E according to this invention. This capacitor has no sealing. The aluminum electrolytic capacitor E was subjected to aging by applying a voltage of 400 V for 2 hours at a temperature of 80° C.

(Comparative Example 3.1)

An aluminum electrolytic capacitor F having no sealing was produced by using a known liquid electrolyte. The foils used for the positive electrode sheet with a dielectric layer and the negative electrode sheet were the same kind as those used in the aluminum electrolytic capacitor E. Two electrode sheets were laminated having a separator made of Manila fiber having a porosity of 50%, a thickness of 0.1 mm and a size of 3 cm×100 cm sandwiched therebetween. Another separator was placed on one of the electrode sheets. The thus obtained lamination was rolled up. The liquid electrolyte including 1 g of ammonium adipate and 9 g of ethylene glycol was injected into the rolled up sheets, which was subjected to a vacuum impregnation at room temperature for 1 minute by using a pressure of 5 Torr, thereby producing the aluminum electrolytic capacitor F. The aluminum electrolytic capacitor F was subjected to aging by applying a voltage of 400 V for 24 hours at room temperature.

An accelerating test was conducted on the aluminum electrolytic capacitors E and F to evaluate the stability of the respective electrolytes at a high temperature. A change in the tangent of the loss angle (tan δ) and a change in the equivalent series resistance (ESR) with time at a temperature of 85° C. was observed. The measurement was conducted at a temperature of 20° C. and a frequency of 120 Hz. The results are shown in FIGS. 11 and 12.

Figure 12:
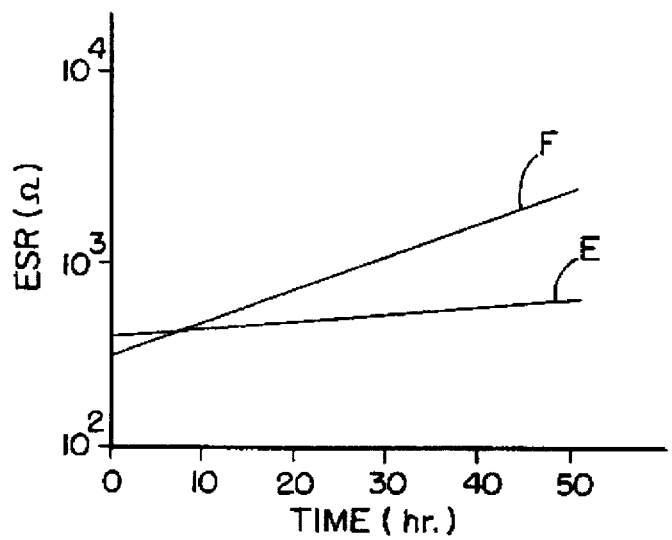
FIG. 12 shows a change with time in the equivalent series resistivity of the electrolytic capacitor according to this invention and the conventional electrolytic capacitor.

As are shown in FIGS. 11 and 12, the conventional aluminum electrolytic capacitor F using the liquid electrolyte including ethylene glycol as a solvent degrades earlier than the electrolytic capacitor E using the polymer electrolyte according to the present invention. Thus, the aluminum electrolytic capacitor of this invention exhibits a sufficiently high reliability at a high temperature.

(Examples 3.2 through 3.8)

Electrolytic capacitors were produced in the same manner as in Example 3.1 except that the kinds and amounts of plasticizers and salts as shown in Table 8 were used. Each content of the salts listed in Table 8 is that used based on the weight of the plasticizer.

These aluminum electrolytic capacitors were evaluated in the same manner as in Example 3.1 and the obtained characteristics are listed in Table 9. The characteristics of the aluminum electrolytic capacitor F are also included in Tables 8 and 9 for comparison. As is obvious from Tables 8 and 9, the aluminum electrolytic capacitor F obtained in Comparative Example 3.1 degrades greatly when kept at a temperature of 85° C. for 50 hours. On the contrary, the aluminum electrolytic capacitors according to this invention are remarkably improved so as not to degrade at a high temperature.

In Examples 3.1 through 3.8, the aluminum electrolytic capacitors were produced by using an aluminum foil. Other electrolytic capacitors were produced by using a tantalum foil or a titanium foil for a positive electrode sheet, and these were also found to have excellent shelf life characteristics.

TABLE 8

| Example/ Comparative Example | Plasticizer | Salt (wt %) |
|---|---|---|
| Comparative Example | | |
| 3.1 | $HOC_2H_4OH$ | Ammonium adipate (10) |
| Example | | |
| 3.2 | $HO(C_2H_4O)_3H$ | Ammonium adipate (10) |
| 3.3 | $HO(C_2H_4O)_4H$ | Ammonium 1,6-decandicarboxylate (10) |
| 3.4 | $CH_3O(C_2H_4O)_3H$ | Ammonium azelate (10) |
| 3.5 | $CH_3O(C_2H_4O)_4H$ | Ammonium geranate (10) |
| 3.6 | $C_4H_9O(C_2H_4O)_2C_4H_9$ | Tetraethylammonium maleate (10) |
| 3.7 | $C_4H_9O(C_2H_4O)_3C_4H_9$ | Tetraethylammonium maleate (10) |
| 3.8 | $C_4H_9O(C_2H_4O)_2H$ | Tetraethylammonium phthalate (10) |

TABLE 9

| | Initial | | Increasing Ratio (%) after 50 hrs. at 85° C. | |
|---|---|---|---|---|
| | Tanδ | ESR(Ω/cm²) | Tanδ | ESR |
| Comparative Example | | | | |
| 3.1 | 0.04 | 400 | 500 | 600 |
| Example | | | | |
| 3.2 | 0.05 | 500 | 100 | 120 |
| 3.3 | 0.06 | 600 | 80 | 100 |
| 3.4 | 0.06 | 600 | 70 | 90 |
| 3.5 | 0.08 | 800 | 50 | 60 |
| 3.6 | 0.10 | 1000 | 20 | 25 |

TABLE 9-continued

| | Initial | | Increasing Ratio (%) after 50 hrs. at 85° C. | |
|---|---|---|---|---|
| | Tanδ | ESR(Ω/cm²) | Tanδ | ESR |
| 3.7 | 0.08 | 800 | 10 | 12 |
| 3.8 | 0.06 | 600 | 50 | 60 |

(Example 4.1)

Figure 13:
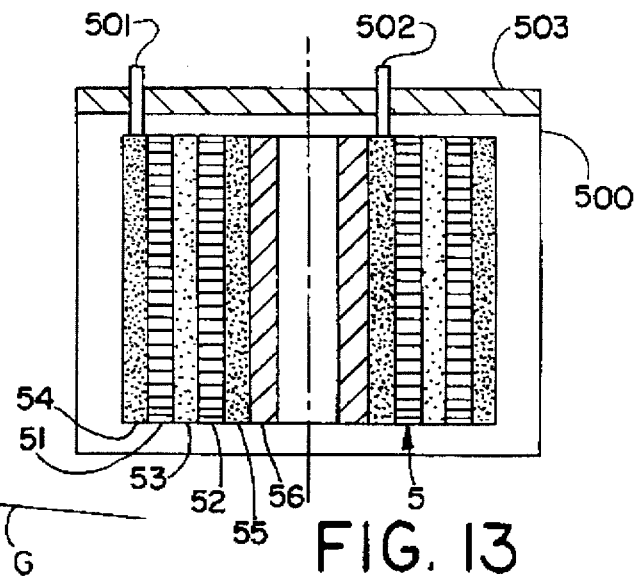
FIG. 13 is one typical diagram of a lithium secondary battery according to the present invention.

FIG. 13 shows a typical structure of a lithium secondary battery of this invention. The lithium secondary battery comprises an element 5 obtained by rolling up a laminate including a current collector sheet 54 for a positive electrode made of a nickel sheet with a thickness of 0.05 mm, a positive electrode layer 51 made of $LiCoO_2$, acetylene black and a polymer electrolyte, a electrolytic layer 53 made of a polymer electrolyte, a negative electrode layer 52 made of graphite, acetylene black and a polymer electrolyte, a current collector sheet 55 for a negative electrode made of a nickel sheet with a thickness of 0.05 mm and a separator 56. The current collector sheet 54 and 55 are provided with terminals 501 and 502, respectively. The element 5 is contained in a container 500 such as an aluminum container and sealed with a sealing material 503.

The lithium secondary battery was produced in the following manner: A base polymer was obtained by substituting with an acryloyl group a hydrogen atom at a molecular terminal of a polymer represented by Formula VI, wherein $(k_1+m_1) \times n_1$, $(k_2+m_2) \times n_2$ and $(k_3+m_3) \times n_3$ are approximately 25 on an average, respectively. One hundred grams of the base polymer, 9.4 g of $LiBF_4$ as a lithium salt, and 100 ml of $CH_3O(C_2H_4O)_5C_4H_9$ as a plasticizer were weighed in dry air and mixed and starred to obtain a polymer electrolytic solution. To 100 g of the polymer electrolytic solution, 40 g of graphite having an average particle size of 5 μm and 2 g of acetylene black were added. The mixture was then ground by using a ball mill made of alumina for 24 hours to obtain a polymer electrolytic solution for a negative electrode. To another 100 g of the polymer electrolytic solution, 40 g of $LiCoO_2$ in the shape of powder having an average particle size of 5 μm and 2 g of acetylene black were added. The mixture was similarly ground by using a ball mill made of alumina for 24 hours to obtain an electrolytic solution for a positive electrode. The powder of $LiCoO_2$ to be used herein was produced by mixing predetermined amounts of commercially available $Li_2CO_3$ and $Co_3O_4$, heat-treating the mixture for 5 hours at a temperature of 400° C. and heating the resultant mixture for another 5 hours at a temperature of 850° C.

The terminals 501 and 502 were provided to the current collector sheets 54 and 55 made of a titanium foil with a thickness of 20 μm. The electrolytic solution for a positive electrode was coated onto the current collector sheet 54 by using a wire rod to form a layer of 0.2 mm thickness, which was then cured by electron beam irradiation to obtain a positive electrode layer 51. The electrolytic solution for a negative electrode was also coated onto the current collector sheet 55 by using a wire rod to form a layer of 0.5 mm thickness, which was also cured by electron beam irradiation to obtain a negative electrode layer The polymer electrolytic solution was further coated onto each of the electrode layers to form a layer with a thickness of 0.5 mm, respectively, then, cured by electron beam irradiation to form the electrolytic layer 53. The electron beam irradiation was conducted with an accelerating voltage of 750 keV and an exposure of 2 Mrad in an atmosphere of nitrogen.

The obtained positive sheet and the negative sheet both bearing the electrolytic layers were cut into a size of 2.5×40 cm, respectively. The obtained sheets were adhered to each other with the electrolytic layers opposing each other, which was then rolled up together with a separator 56, to give the element 5. The element 5 was contained in an aluminum container 500. A DC voltage of 4.3 V was applied to the element 5 for 5 hours at a temperature of 30° C. Then, the aluminum container was sealed with the sealing material 503 made of an epoxy resin to obtain the lithium secondary battery G according to The present invention.

(Comparative Example 4.1)

A lithium secondary battery H was produced by using a known liquid electrolyte as follows:

Similarly to Example 4.1, 50 g of graphite having an average particle size of 5 μm, 3 g of acetylene black and 50 g of a methanol solution in which polytetrafluoroethylene (5 wt %) was dispersed were mixed by using a ball mill made of alumina for 24 hours to obtain an electrolytic solution for a negative electrode. Similarly, 50 g of $LiCoO_2$ powder having an average particle size of 5 μm, 3 g of acetylene black and 50 g of a methanol solution in which polytetrafluoroethylene (5 wt %) was dispersed were mixed by using a ball mill made of alumina for 24 hours to obtain an electrolytic solution for a positive electrode.

The obtained electrolytic solution for a positive electrode was coated onto a current collector made of a titanium foil which is the same kind as that used in Example 4.1 by using a wire rod to form a layer with a thickness of 100 μm, which was then cured by allowing to stand in an atmosphere of nitrogen at a temperature of 200° C. for 24 hours to obtain a positive electrode sheet. A negative electrode sheet was obtained in the same manner except that the layer formed by coating the electrolytic solution for a negative electrode had a thickness of 50 μm. The positive electrode with the current collector sheet and the negative electrode with the current collector sheet were respectively cut into a size of 2.5 cm×40 cm. The cut sheets were laminated having a separator made of polypropyrene having a porosity of 40% and a thickness of 40 μm sandwiched therebetween. Another separator was placed on one of the current collector. The thus obtained lamination was rolled up. The resulting battery element was placed in an aluminum container whose inner surface had been coated with titanium. The liquid electrolyte comprising propylons carbonate including 1 mol/l of $LiBF_4$ was poured into the aluminum container, which was then subjected to vacuum impregnation by using a pressure of 5 Torr for 1 minute. A DC voltage of 4.3 V was applied to the element at a temperature of 30° C. for 5 hours. The resultant aluminum container was sealed with an epoxy resin, the sealing material to obtain the lithium secondary battery H.

The lithium secondary batteries G and H were subjected to a charge-discharge cycle test. The test was conducted at a temperature of 80° C. at a constant current of 8 mA with an upper limit voltage of 4.3 V and a lower limit voltage of 3 V. The results are shown in FIG. 14.

Figure 14:
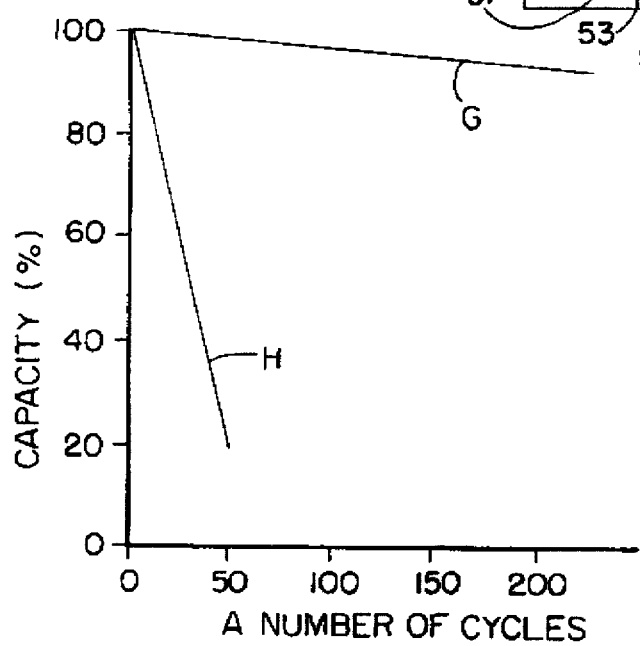
FIG. 14 shows a change in the discharge capacity of a lithium secondary battery according to this invention and a conventional lithium secondary battery obtained after repeating discharge-charge cycles.

In FIG. 14, the abscissa indicates a number of the charge-discharge cycles, and the ordinate indicates a discharging capacity. As is apparent from FIG. 14, the lithium secondary battery H obtained in Comparative Example 4.1 degrades earlier than lithium secondary battery G according to the present invention, which has 10% or less of degradation in the discharging capacity even after repeating 200 cycles.

Various other modifications will be apparent to and can be readily made by those skilled in the art without departing from the scope and spirit of this invention. Accordingly, it is not intended scope of the claims appended hereto be limited to the description as set forth herein, but rather that the claims be broadly construed.

What is claimed is:

1. An ionic conductive polymer electrolyte comprising a polymer having an ether moiety in its structure and a plasticizer, wherein the plasticizer is at least one compound selected from the group consisting of compounds represented by the following general Formulas IV and V:

Formula IV:

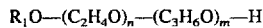

wherein n+m is 2, 3, 4 or 5, and $R_1=CH_3$, $C_2H_5$, $C_3H_7$ or $C_4H_9$; and Formula V:

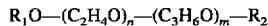

wherein n+m is 2, 3, 4, or 5 and $R_1=R_2=CH_3$.

2. An ionic conductive polymer electrolyte according to claim 1, wherein the polymer includes a polyether skeleton, and the polyether is a random copolymer of oxyethylene and oxypropylene having a degree of polymerization of 2 to 200.

3. An ionic conductive polymer electrolyte according to claim 1, wherein the polymer has a polymerizable double bond at a terminal of its molecule.

4. An ionic conductive polymer electrolyte according to claim 1, wherein the polymer is a cross-linked polymer.

5. An ionic conductive polymer electrolyte according to claim 4, wherein the cross-linked polymer is cross-linked with a urethane bond.

6. An ionic conductive polymer electrolyte according to claim 4, wherein the cross-linked polymer includes a cross-linked structure which is derived from an acryloyl group or a methacyloyl group.

7. An ionic conductive polymer electrolyte according to claim 1 further comprising an ammonium salt.

8. An ionic conductive polymer electrolyte according to claim 1, wherein the ammonium salt is at least one selected from the group consisting of tetraalkylammonium salt having $CF_3SO_3$, $ClO_4$, $BF_4$ or $PF_6$ as an anion, ammonium carboxylate and tetraalkylammonium carboxylate.

9. An ionic conductive polymer electrolyte according to claim 7, wherein the ammonium salt is at least one selected from the group consisting of ammonium adipate, ammonium azelate, ammonium benzoate, ammonium γ-resorcylate, tetramethylammonium tetrafluoroborate, tetraethylammonium tetrafluoroborate, tetrapropylammonium tetrafluoroborate, tetramethylammonium hexafluorophosphate, tetraethylammonium hexafluorophosphate, and tetrapropylammonium hexafluorophosphate.

10. An ionic conductive polymer electrolyte according to claim 7, wherein the ammonium salt is at least one selected from the group consisting of quaternary ammonium borate, quaternary ammonium phosphate, ammonium carboxylate and quaternary ammonium carboxylate.

11. An ionic conductive polymer electrolyte comprising a polymer having an ether moiety in the structure, a plasticizer and an ammonium salt, wherein the plasticizer is monoethylene glycol.

12. An ionic conductive polymer electrolyte according to claim 11, wherein the polymer includes a polyether skeleton and the polyether is a random copolymer of oxyethylene and oxypropylene having a degree of polymerization of 2 to 200.

13. An ionic conductive polymer electrolyte according to claim 11, wherein the polymer has a polymerizable double bond at a terminal of its molecule.

14. An ionic conductive polymer electrolyte according to claim 11, wherein the polymer is a cross-linked polymer.

15. An ionic conductive polymer electrolyte according to claim 14, wherein the cross-linked polymer is cross-linked with a urethane bond.

16. An ionic conductive polymer electrolyte according to claim 14, wherein the cross-linked polymer includes a cross-linked structure which is derived from an acryloyl group or a methacryloyl group.

17. An ionic conductive polymer electrolyte according to claim 11, wherein the ammonium salt is at least one selected from the group consisting of tetraalkylammonium salt having $CF_3SO_3$, $ClO_4$, $BF_4$ or $PF_6$ as an anion, ammonium carboxylate and tetrealkylammonium carboxylate salt.

18. An ionic conductive polymer electrolyte according to claim 11, wherein the ammonium salt is selected from the group consisting of ammonium adipate, ammonium azelate, ammonium benzoate, ammonium γ-resorcylate, tetramethylammonium tetrafluoroborate, tetraethylammonium tetrafluoroborate, tetrapropylammonium tetrafluoroborate, tetramethylammonium hexafluorophosphate, tetraethylammonium hexafluorophosphate, and tetrapropylammonium hexafluorophosphate.

19. An electric double layer capacitor comprising a pair of electrodes, an electrolytic layer and a current collector, wherein the pair of the electrodes are made of activated carbon and an ionic conductive polymer electrolyte wherein the ionic conductive polymer electrolyte comprises a polymer having an ether moiety in its structure and a plasticizer, wherein the plasticizer is at least one compound selected from the group consisting of compounds represented by the following general Formulas I, II, III, IV and V:

Formula I:

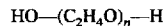

wherein n is 2, 3, 4 or 5;

Formula II:

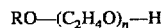

wherein R is $CH_3$, $C_2H_5$, $C_3H_7$ or $C_4H_9$; and n is 3, 4 or 5;

Formula III:

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;

Formula IV:

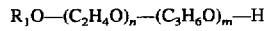

wherein n+m is 2, 3, 4 or 5, and $R_1=CH_3$, $C_2H_5$, $C_3H_7$ or $C_4H_9$; and Formula V:

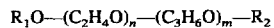

wherein n+m is 2, 3, 4, or 5 and $R_1=R_2=CH_3$, the pair of the electrodes are disposed opposing each other having the electrolytic layer sandwiched therebetween, and the electrolytic layer is made of an ionic conductive polymer electrolyte having, as a charge carrier, an ion which is the same kind of ion as the moving ion in the ionic conductive polymer electrolyte used in the electrodes.

20. An electric double layer capacitor according to claim 19,
wherein the weight A of the polymer and the weight B of the plasticizer satisfy the following relationship:

$$1 \leq (B/A) \leq 3.$$

21. An electric double layer capacitor according to claim 19,
wherein the weight X of the activated carbon and the weight Y of the polymer satisfy the following relationship:

$$0.5 < (X/Y) \leq 1.5;$$

and
the activated carbon has a specific surface area of 1,000 to 10,000 m²/g and micropores with a size of 1.5 nm to 3 nm.

22. An electric double layer capacitor comprising a pair of electrodes, an electrolytic layer and a current collector,
wherein the pair of electrodes are made of activated carbon and the ionic conductive polymer electrolyte according to claim 11,
the pair of electrodes are disposed opposing each other having the electrolytic layer sandwiched therebetween, and
the electrolytic layer is made of an ionic conductive polymer electrolyte having, as a charge carrier, an ion which is the same kind of ion as the moving ion in the ionic conductive polymer electrolyte used in the electrodes.

23. An electric double layer capacitor according to claim 22,
wherein the weight A of the polymer and the weight B of the plasticizer satisfy the following relationship:

$$1 \leq (B/A) \leq 3.$$

24. An electric double layer capacitor according to claim 22,
wherein the weight X of the activated carbon and the weight Y of the polymer satisfy the following relationship:

$$0.5 < (X/Y) \leq 1.5;$$

and
the activated carbon has a specific surface area of 1,000 to 10,000 m²/g and micropores with a size of 1.5 nm to 3 nm.

25. An electrolytic capacitor comprising an electrolytic layer, a dielectric layer including a metal oxide, and an electric conductive electrode; wherein the electrolytic layer comprises an ionic conductive polymer electrolyte, wherein the ionic conductive polymer electrolyte comprises a polymer having an ether moiety in its structure and a plasticizer, wherein the plasticizer is at least one compound selected from the group consisting of compounds represented by the following general Formulas I, II, III, IV and V:

Formula I:

wherein n is 2, 3, 4 or 5;
Formula II:

wherein R is $CH_3$, $C_2H_5$, $C_3H_7$ or $C_4H_9$; and n is 3, 4 or 5;
Formula III:

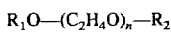

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;
Formula IV:

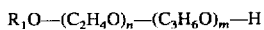

wherein n+m is 2, 3, 4 or 5, and $R_1=CH_3$, $C_2H_5$, $C_3H_7$ or $C_4H_9$; and
Formula V:

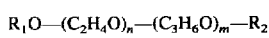

wherein n+m is 2, 3, 4, or 5 and $R_1=R_2=CH_3$.

26. An ionic conductive polymer electrolyte comprising a polymer having an ether moiety in the structure, a plasticizer and an ammonium salt, wherein the plasticizer is at least one compound selected from the group consisting of monoethylene glycol, γ-butyrolactone, propylene carbonate and ethylene carbonate,
wherein the polymer is represented by the following Formula VI:

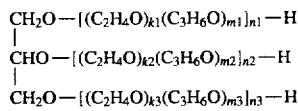

wherein k1, k2, k3, m1, m2, m3, n1, n2 and n3 are positive integers, respectively; and (k1+m1)×n1, (k2+m2)×n2 and (k3+m3)×n3 are independently 2 to 50.

27. An ionic conductive polymer electrolyte according to claim 26, wherein the ammonium salt is at least one compound selected from the group consisting of tetraalkylammonium salt having $CF_3SO_3$, $ClO_4$, $BF_4$ or $PF_6$ as an anion, ammonium carboxylate and tetraalkylammonium carboxylate salt.

28. An ionic conductive polymer electrolyte according to claim 26, wherein the ammonium salt is selected from the group consisting of ammonium adipate, ammonium azelate, ammonium benzoate, ammonium γ-resorcylate, tetramethylammonium tetrafluoroborate, tetraethylammonium tetrafluoroborate, tetrapropylammonium tetrafluoroborate, tetramethylammonium hexafluorophosphate, tetraethylammonium hexafluorophosphate, and tetrapropylammonium hexafluorophosphate.

29. An ionic conductive polymer electrolyte comprising a polymer having an ether moiety in its structure, a plasticizer and an ammonium salt, wherein the plasticizer is at least one compound selected from the group consisting of monoethylene glycol, γ-butyrolactone, propylene carbonate and ethylene carbonate, wherein the polymer has a structure in which hydrogen at a terminal of a polymer represented by the following Formula VI is substituted with a substituent having a polymerizable double bond:

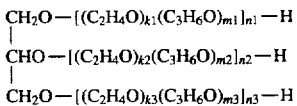

Formula VI:

wherein k1, k2, k3, m1, m2, m3, n1, n2 and n3 are positive integers, respectively; and (k1+m1)×n1, (k2+m2)×n2 and (k3+m3)×n3 are independently 2 to 50.

30. An ionic conductive polymer electrolyte according to claim 29, wherein the ammonium salt is at least one compound selected from the group consisting of tetraalkylammonium salt having $CF_3SO_3$, $ClO_4$, $BF_4$ or $PF_6$ as an anion, ammonium carboxylate and tetraalkylammonium carboxylate salt.

31. An ionic conductive polymer electrolyte according to claim 29, wherein the ammonium salt is selected from the group consisting of ammonium adipate, ammonium azelate, ammonium benzoate, ammonium γ-resorcylate, tetramethylammonium tetrafluoroborate, tetraethylammonium tetrafluoroborate, tetrapropylammonium tetrafluoroborate, tetramethylammonium hexafluorophosphate, tetraethylammonium hexafluorophosphate, and tetrapropylammonium hexafluorophosphate.

32. An ionic conductive polymer electrolyte comprising a polymer having an ether moiety in its structure, a plasticizer and an ammonium salt, wherein the plasticizer is at least one compound selected from the group consisting of monoethylene glycol, γ-butyrolactone, propylene carbonate and ethylene carbonate, wherein the polymer is a cross-linked polymer obtained by cross-linking a polymer represented by the following Formula VI:

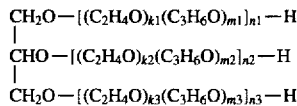   Formula VI:

wherein k1, k2, k3, m1, m2, m3, n1, n2 and n3 are positive integers, respectively; and (k1+m1)×n1, (k2+m2)×n2 and (k3+m3)×n3 are independently 2 to 50.

33. An ionic conductive polymer electrolyte according to claim 32, wherein the cross-linked polymer is cross-linked with a urethane bond.

34. An ionic conductive polymer electrolyte according to claim 32, wherein the cross-linked polymer includes a cross-linked structure which is derived from an acryloyl group or a methacryloyl group.

35. An ionic conductive polymer electrolyte according to claim 32, wherein the ammonium salt is at least one compound selected from the group consisting of tetraalkylammonium salt having $CF_3SO_3$, $ClO_4$, $BF_4$ or $PF_6$ as an anion, ammonium carboxylate and tetraalkylammonium carboxylate salt.

36. An ionic conductive polymer electrolyte according to claim 32, wherein the ammonium salt is selected from the group consisting of ammonium adipate, ammonium azelate, ammonium benzoate, ammonium γ-resorcylate, tetramethylammonium tetrafluoroborate, tetraethylammonium tetrafluoroborate, tetrapropylammonium tetrafluoroborate, tetramethylammonium hexafluorophosphate, tetraethylammonium hexafluorophosphate, and tetrapropylammonium hexafluorophosphate.

37. An ionic conductive polymer electrolyte comprising a polymer having an ether moiety in its structure and a plasticizer, wherein the plasticizer is at least one compound selected from the group consisting of compounds represented by the following general Formulas I, II, III, IV and V:

Formula I:

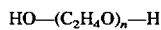

wherein n is 2, 3, 4 or 5;

Formula II:

wherein R is $CH_3$, $C_2H_5$, $C_3H_7$ or $C_4H_9$; and n is 3, 4 or 5;

Formula III:

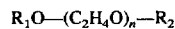

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;

Formula IV:

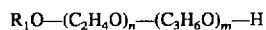

wherein n+m is 2, 3, 4 or 5, and $R_1=CH_3$, $C_2H_5$, $C_3H_7$, or $C_4H_9$; and Formula V:

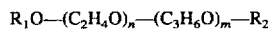

wherein n+m is 2, 3, 4 or 5 and $R_1=R_2=CH_3$, wherein the polymer is represented by the following Formula VI:

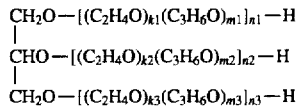   Formula VI:

wherein k1, k2, k3, m1, m2, m3, n1, n2 and n3 are positive integers, respectively; and (k1+m1)×n1, (k2+m2)×n2 and (k3+m3)×n3 are independently 2 to 50.

38. An ionic conductive polymer electrolyte comprising a polymer having an ether moiety in its structure and a plasticizer, wherein the plasticizer is at least one compound selected from the group consisting of compounds represented by the following general Formulas I, II, III, IV and V:

Formula I:

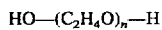

wherein n is 2, 3, 4 or 5;

Formula II:

wherein R is $CH_3$, $C_2H_5$, $C_3H_7$ or $C_4H_9$; and n is 3, 4 or 5;

Formula III:

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;

Formula IV:

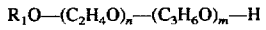

wherein n+m is 2, 3, 4 or 5, and $R_1=CH_3$, $C_2H_5$, $C_3H_7$, or $C_4H_9$; and Formula V:

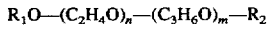

wherein n+m is 2, 3, 4 or 5 and $R_1=R_2=CH_3$, wherein the polymer has a structure in which hydrogen at a terminal of a polymer represented by the following Formula VI is substituted with a substituent having a polymerizable double bond:

$$\begin{array}{l}\text{CH}_2\text{O}-[(\text{C}_2\text{H}_4\text{O})_{k1}(\text{C}_3\text{H}_6\text{O})_{m1}]_{n1}-\text{H}\\|\\\text{CHO}-[(\text{C}_2\text{H}_4\text{O})_{k2}(\text{C}_3\text{H}_6\text{O})_{m2}]_{n2}-\text{H}\\|\\\text{CH}_2\text{O}-[(\text{C}_2\text{H}_4\text{O})_{k3}(\text{C}_3\text{H}_6\text{O})_{m3}]_{n3}-\text{H}\end{array}\qquad\text{Formula VI:}$$

wherein k1, k2, k3, m1, m2, m3, n1, n2 and n3 are positive integers, respectively; and (k1+m1)×n1, (k2+m2)×n2 and (k3+m3)×n3 are independently 2 to 50.

39. An ionic conductive polymer electrolyte comprising a polymer having an ether moiety in its structure and a plasticizer, wherein the plasticizer is at least one compound selected from the group consisting of compounds represented by the following general Formulas I, II, III, IV and V:

Formula I:

$$\text{HO}-(\text{C}_2\text{H}_4\text{O})_n-\text{H}$$

wherein n is 2, 3, 4 or 5;

Formula II:

$$\text{RO}-(\text{C}_2\text{H}_4\text{O})_n-\text{H}$$

wherein R is $CH_3$, $C_2H_5$, $C_3H_7$ or $C_4H_9$; and n is 3, 4 or 5;

Formula III:

$$R_1O-(C_2H_4O)_n-R_2$$

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;

Formula IV:

$$R_1O-(C_2H_4O)_n-(C_3H_6O)_m-H$$

wherein n+m is 2, 3, 4 or 5, and $R_1=CH_3$, $C_2H_5$, $C_3H_7$, or $C_4H_9$; and Formula V:

$$R_1O-(C_2H_4O)_n-(C_3H_6O)_m-R_2$$

wherein n+m is 2, 3, 4 or 5 and $R_1=R_2=CH_3$, wherein the polymer is a cross-linked polymer obtained by cross-linking a polymer represented by the following Formula VI:

$$\begin{array}{l}\text{CH}_2\text{O}-[(\text{C}_2\text{H}_4\text{O})_{k1}(\text{C}_3\text{H}_6\text{O})_{m1}]_{n1}-\text{H}\\|\\\text{CHO}-[(\text{C}_2\text{H}_4\text{O})_{k2}(\text{C}_3\text{H}_6\text{O})_{m2}]_{n2}-\text{H}\\|\\\text{CH}_2\text{O}-[(\text{C}_2\text{H}_4\text{O})_{k3}(\text{C}_3\text{H}_6\text{O})_{m3}]_{n3}-\text{H}\end{array}\qquad\text{Formula VI:}$$

wherein k1, k2, k3, m1, m2, m3, n1, n2 and n3 are positive integers, respectively; and (k1+m1)×n1, (k2+m2)×n2 and (k3+m3)×n3 are independently 2 to 50.

40. An ionic conductive polymer electrolyte according to claim 39, wherein the cross-linked polymer is cross-linked with a urethane bond.

41. An ionic conductive polymer electrolyte according to claim 39, wherein the cross-linked polymer includes a cross-linked structure which is derived from an acryloyl group or a methacryloyl group.

42. An ionic conductive polymer electrolyte comprising a polymer having an ether moiety in its structure, a plasticizer and a phosphonium salt, wherein the plasticizer is at least one compound selected from the group consisting of compounds represented by the following general Formulas I, II, III, IV and V:

Formula I:

$$\text{HO}-(\text{C}_2\text{H}_4\text{O})_n-\text{H}$$

wherein n is 2, 3, 4 or 5;

Formula II:

$$\text{RO}-(\text{C}_2\text{H}_4\text{O})_n-\text{H}$$

wherein R is $CH_3$, $C_2H_5$, $C_3H_7$ or $C_4H_9$; and n is 3, 4 or 5;

Formula III:

$$R_1O-(C_2H_4O)_n-R_2$$

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;

Formula IV:

$$R_1O-(C_2H_4O)_n-(C_3H_6O)_m-H$$

wherein n+m is 2, 3, 4 or 5, and $R_1=CH_3$, $C_2H_5$, $C_3H_7$, or $C_4H_9$; and Formula V:

$$R_1O-(C_2H_4O)_n-(C_3H_6O)_m-R_2$$

wherein n+m is 2, 3, 4 or 5 and $R_1=R_2=CH_3$.

43. An ionic conductive polymer electrolyte according to claim 42, wherein the phosphonium salt is at least one selected from the group consisting of tetraalkylphosphonium salt having $CF_3SO_3$, $ClO_4$, $BF_4$ or $PF_6$ as an anion and tetraalkylphosphonium carboxylate.

44. An ionic conductive polymer electrolyte comprising a polymer having an ether moiety in its structure and a plasticizer, wherein the plasticizer is represented by the Formula V:

Formula V:

$$R_1O-(C_2H_4O)_n-(C_3H_6O)_m-R_2$$

wherein n+m is 2, 3, 4 or 5 and $R_1=R_2=CH_3$.

45. An ionic conductive polymer electrolyte according to claim 44, wherein the polymer has a polyether skeleton, and the polyether is a random copolymer of oxyethylene and oxypropylene having a degree of polymerization of 2 to 200.

46. An ionic conductive polymer electrolyte according to claim 44, wherein the polymer has a polymerizable double bond at a terminal of its molecule.

47. An ionic conductive polymer electrolyte according to claim 44, wherein the polymer is a cross-linked polymer.

48. An ionic conductive polymer electrolyte according to claim 47, wherein the cross-linked polymer is cross-linked with a urethane bond.

49. An ionic conductive polymer electrolyte according to claim 47, wherein the cross-linked polymer includes a cross-linked structure which is derived from an acryloyl group or a methacryloyl group.

50. An ionic conductive polymer electrolyte according to claim 44, wherein the polymer is represented by the following Formula VI:

$$\begin{array}{l}\text{CH}_2\text{O}-[(\text{C}_2\text{H}_4\text{O})_{k1}(\text{C}_3\text{H}_6\text{O})_{m1}]_{n1}-\text{H}\\|\\\text{CHO}-[(\text{C}_2\text{H}_4\text{O})_{k2}(\text{C}_3\text{H}_6\text{O})_{m2}]_{n2}-\text{H}\\|\\\text{CH}_2\text{O}-[(\text{C}_2\text{H}_4\text{O})_{k3}(\text{C}_3\text{H}_6\text{O})_{m3}]_{n3}-\text{H}\end{array}\qquad\text{Formula VI:}$$

wherein k1, k2, k3, m1, m2, m3, n1, n2 and n3 are positive integers, respectively; and (k1+m1)×n1, (k2+m2)×n2 and (k3+m3)×n3 are independently 2 to 50.

51. An ionic conductive polymer electrolyte according to claim 44, wherein the polymer has a structure in which hydrogen at a terminal of a polymer represented by the following Formula VI is substituted with a substituent having a polymerizable double bond:

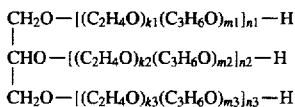   Formula VI:

wherein k1, k2, k3, m1, m2, m3, n1, n1 and n3 are positive integers, respectively; and (k1+m1)×n1, (k2+m2)×n2 and (k3+m3)×n3 are independently 2 to 50.

52. An ionic conductive polymer electrolyte according to claim 44, wherein the polymer is a cross-linked polymer obtained by cross-linking a polymer represented by the following Formula VI:

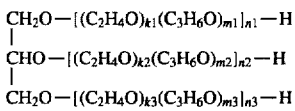   Formula VI:

wherein k1, k2, k3, m1, m2, m3, n1, n2 and n3 are positive integers, respectively; and (k1+m1)×n1, (k2+m2)×n2 and (k3+m3)×n3 are independently 2 to 50.

53. An ionic conductive polymer electrolyte according to claim 52, wherein the cross-linked polymer is cross-linked with a urethane bond.

54. An ionic conductive polymer electrolyte according to claim 52, wherein the cross-linked polymer includes a cross-linked structure which is derived from a acryloyl group or a methacryloyl group.

55. An ionic conductive polymer electrolyte according to claim 44 further comprising a lithium salt.

56. A lithium secondary battery comprising an electrolytic layer, a positive electrode and a negative electrode; wherein the electrolytic layer comprises the polymer electrolyte according to claim 44.

57. An ionic conductive polymer electrolyte comprising a polymer having an ether moiety in its structure and a plasticizer, wherein the polymer includes a polyether skeleton, and the polyether is a random copolymer of oxyethylene and oxypropylene having a degree of polymerization of 2 to 200, wherein the plasticizer is at least one compound selected from the group consisting of compounds represented by the following general Formulas I, II, III, IV and V:

Formula I:

wherein n is 2, 3, 4 or 5;

Formula II:

wherein R is $CH_3$, $C_2H_5$, $C_3H_7$ or $C_4H_9$; and n is 3, 4 or 5;

Formula III:

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;

Formula IV:

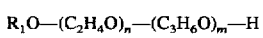

wherein n+m is 2, 3, 4 or 5, and $R_1=CH_3$, $C_2H_5$, $C_3H_7$ or $C_4H_9$; and Formula V:

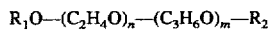

wherein n+m is 2, 3, 4, or 5 and $R_1=R_2=CH_3$.

58. An ionic conductive polymer electrolyte comprising a polymer having an ether moiety in its structure and a plasticizer, wherein the polymer is a cross-linked polymer crosslinked with a urethane bond, wherein the plasticizer is at least one compound selected from the group consisting of compounds represented by the following general Formulas I, II, III, IV and V:

Formula I:

wherein n is 2, 3, 4 or 5;

Formula II:

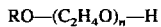

wherein R is $CH_3$, $C_2H_5$, $C_3H_7$ or $C_4H_9$; and n is 3, 4 or 5;

Formula III:

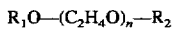

wherein $R_1=R_2=CH_3$, and n is 4, 5 or 6; or $R_1=R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;

Formula IV:

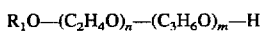

wherein n+m is 2, 3, 4 or 5, and $R_1=CH_3$, $C_2H_5$, $C_3H_7$ or $C_4H_9$; and Formula V:

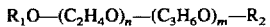

wherein n+m is 2, 3, 4, or 5 and $R_1=R_2=CH_3$.

59. An ionic conductive polymer electrolyte comprising a polymer having an ether moiety in its structure, a plasticizer, and an ammonium salt, wherein the plasticizer is at least one compound selected from the group consisting of compounds represented by the following general Formulas I, II, III, IV and V:

Formula I:

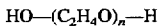

wherein n is 2, 3, 4 or 5;

Formula II:

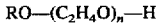

wherein R is $CH_3$, $C_2H_5$, $C_3H_7$ or $C_4H_9$; and n is 3, 4 or 5;

Formula III:

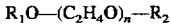

wherein $R_1=R_2=CH_3$, and n is 4, 5 or 6; or $R_1R_2=C_2H_5$, and n is 4, 5 or 6; or $R_1=R_2=C_3H_7$, and n is 3, 4, 5 or 6; or $R_1=R_2=C_4H_9$, and n is 2, 3, 4 or 5; or $R_1=CH_3$, $R_2=C_4H_9$, and n is 4, 5 or 6;

Formula IV:

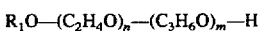

wherein n+m is 2, 3, 4 or 5, and $R_1=CH_3$, $C_2H_5$, $C_3H_7$ or $C_4H_9$; and Formula V:

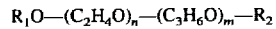
$$R_1O-(C_2H_4O)_n-(C_3H_6O)_m-R_2$$

wherein n+m is 2, 3, 4, or 5 and $R_1=R_2=CH_3$.

60. An ionic conductive polymer electrolyte according to claim 59, wherein the ammonium salt is at least one selected from the group consisting of tetraalkylammonium salt having $CF_3SO_3$, $ClO_4$, $BF_4$ or $PF_6$ as an anion, ammonium carboxylate and tetraalkylammonium carboxylate.

61. An ionic conductive polymer electrolyte according to claim 57, wherein the ammonium salt is at least one selected from the group consisting of ammonium adipate, ammonium azelate, ammonium benzoate, ammonium γ-resorcylate, tetramethylammonium tetrafluoroborate, tetraethylammonium tetrafluoroborate, tetrapropyl-ammonium tetrafluoroborate, tetramethylammonium hexafluorophosphate, tetraethylammonium hexafluorophosphate, and tetrapropylammonium hexafluorophosphate.

62. An ionic conductive polymer electrolyte according to claim 59, wherein the ammonium salt is at least one selected from the group consisting of quaternary ammonium borate, quaternary ammonium phosphate, ammonium carboxylate and quaternary ammonium carboxylate.

* * * * *

UNITED STATES PATENT AND TRADEMARK OFFICE
CERTIFICATE OF CORRECTION

PATENT NO.        : 5,538,811

DATED             : July 23, 1996

INVENTOR(S)       : Teruhisa Kanbara et al.

It is certified that error appears in the above-identified patent and that said Letters Patent is hereby corrected as shown below:

Claim 8, line 2, change "claim 1" to --claim 7--.

Claim 61, line 2, change "claim 57" to --claim 59--.

Signed and Sealed this

Thirteenth Day of January, 1998

Attest:

BRUCE LEHMAN

Attesting Officer

Commissioner of Patents and Trademarks